(12) United States Patent
Naito

(10) Patent No.: US 7,317,549 B2
(45) Date of Patent: Jan. 8, 2008

(54) APPARATUS, METHOD AND PROGRAM FOR PROCESSING INFORMATION ACQUIRED THROUGH A NETWORK

(75) Inventor: Kikuo Naito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 978 days.

(21) Appl. No.: 10/442,233

(22) Filed: May 21, 2003

(65) Prior Publication Data

US 2003/0223094 A1 Dec. 4, 2003

(30) Foreign Application Priority Data

May 31, 2002 (JP) .............................. 2002-159208

(51) Int. Cl.
*G06F 15/00* (2006.01)
*G06K 1/00* (2006.01)

(52) U.S. Cl. ............... 358/1.15; 358/1.14; 358/1.16; 358/1.18; 709/238; 709/217; 705/26; 705/27

(58) Field of Classification Search ............... 358/1.15, 358/1.14, 1.12, 1.9; 709/238
See application file for complete search history.

(56) References Cited

U.S. PATENT DOCUMENTS 7,142,317 B2 * 11/2006 Naito et al. ................ 358/1.15
2002/0051191 A1 5/2002 Naito et al. ................ 358/1.15

* cited by examiner

*Primary Examiner*—Douglas Q. Tran
*Assistant Examiner*—Satwant Singh
(74) *Attorney, Agent, or Firm*—Fitzpatrick, Cella, Harper & Scinto

(57) ABSTRACT

An information processing system appropriately switches communication protocols to acquire content printing information or printing service information from one of a content provider and a printing service provide via a network when contents are to be printed using a number of content providers via the network.

12 Claims, 21 Drawing Sheets

[CONTENTS]
CONTENTSCODE=ABC0001
TYPE=IMAGE
ADDRESS=/PRINTDATA/abc0001.jpg
PREVIEW=/THMB/abc0001_pre.jpg
PRICE=30

[OVERLAY]
STRING="COPYRIGHT"
HORIZONTAL=CENTER
VERTICAL=UNDERBOTTOM

} 701

[PRINT LIMIT]
MAXSIZE=400*290
MAXPAPER=A3
MAXVOLUME=100

} 702

[ETC]
PAYMENT=FINISHED

| CONTENT PROVIDER CODE | BASE ADDRESS | CONTENT PRINTING INFORMATION PATH | USABLE PROTOCOL |
|---|---|---|---|
| 0001 | http://www.sellpc | /info/printinfo | HTTPs, HTTP |
| 0002 | http://www.hanbai_Stock | /printinfo | FTP, HTTP |
| | | | |
| | | | |

| ORDER CODE 901 | CONTENT PROVIDER CODE 902 | CONTENT ADDRESS 903 | STATUS 904 | |
|---|---|---|---|---|
| 1 | 0001 | http://www.sellpc/PRINTDATA/2/AAA0001.jpg | PRINTED | ~911 |
| 2 | 0002 | http://www.hanbai_Stock/print/BSD0002.jpg | READY FOR PRINTING | ~912 |
| 3 | 0002 | http://www.hanbai_Stock/print/CDA0999.jpg | IMAGE UNDER PRODUCTION | ~913 |
| 4 | 0001 | http://www.sellpc/PRINTDATA/2/abc0001.jpg | ORDERING IN PROGRESS | ~914 |

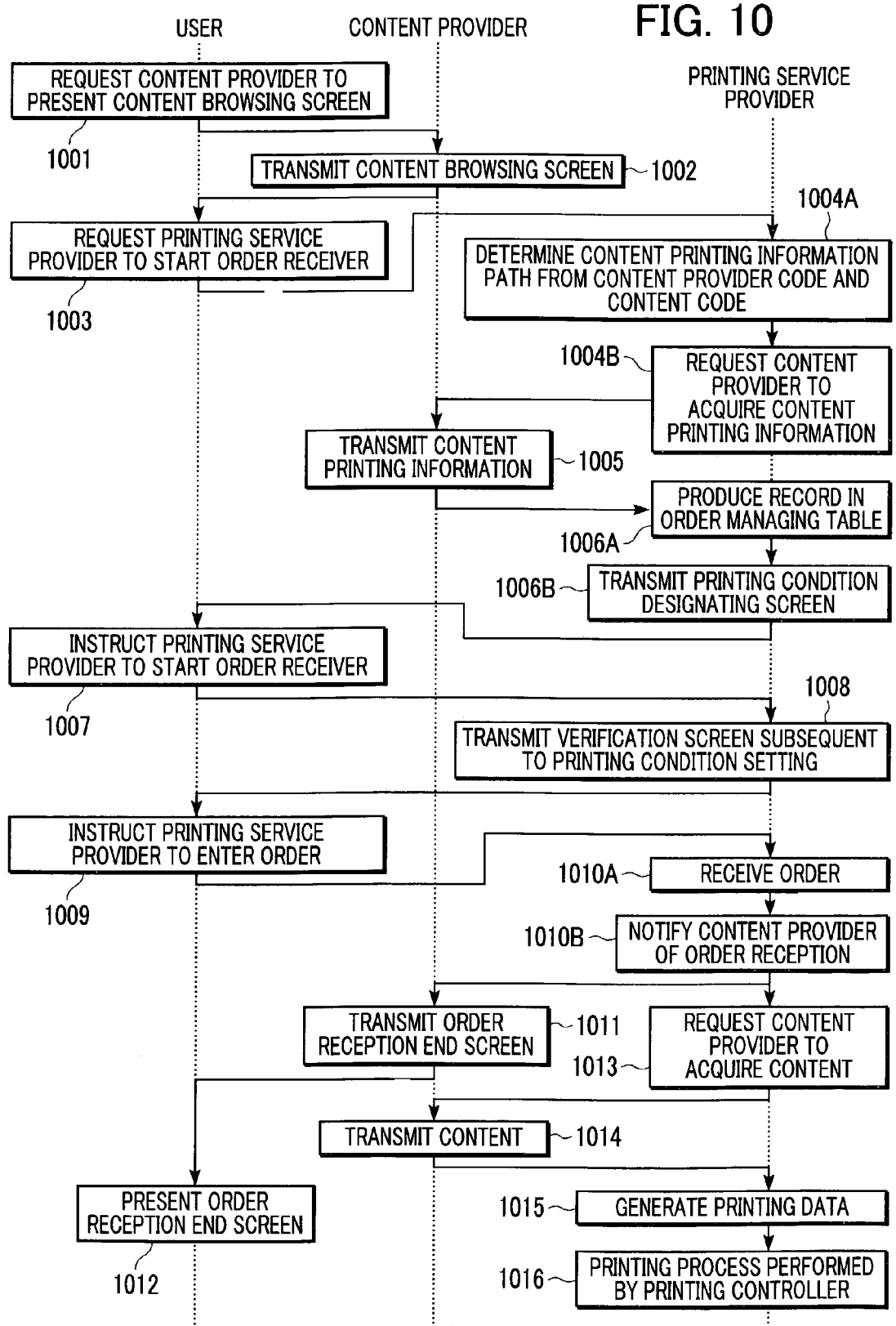

[DATACENTER]
CONTENTSCODE=DEF0001
ADDRESS=http://www.hanbai_Stock/printinfo/DEF0001.inf

FIG. 19

| CONTENT PROVIDER CODE | BASE ADDRESS | PROTOCOL IN USE | |
|---|---|---|---|
| 0001 | http://www.sellpc | HTTPs, HTTP | 1811 |
| 0002 | http://www.hanbai | FTP, HTTP | 1812 |
|  |  |  |  |
|  |  |  |  |

[CONTENTS]
CONTENTSCODE=ABC0001
TYPE=IMAGE
ADDRESS=http://www.sellpc/PRINTDATA/abc0001.jpg
PRICE=30

[OVERLAY]
STRING="COPYRIGHT"
HORIZONTAL=CENTER
VERTICAL=UNDERBOTTOM

} 1901

[PRINT PARAMETER]
PRINTER=A
PAPERSIZE=A4
PRINTVOLUME=1

} 1902

[ETC]
PAYMENT=FINISHED

} 1903

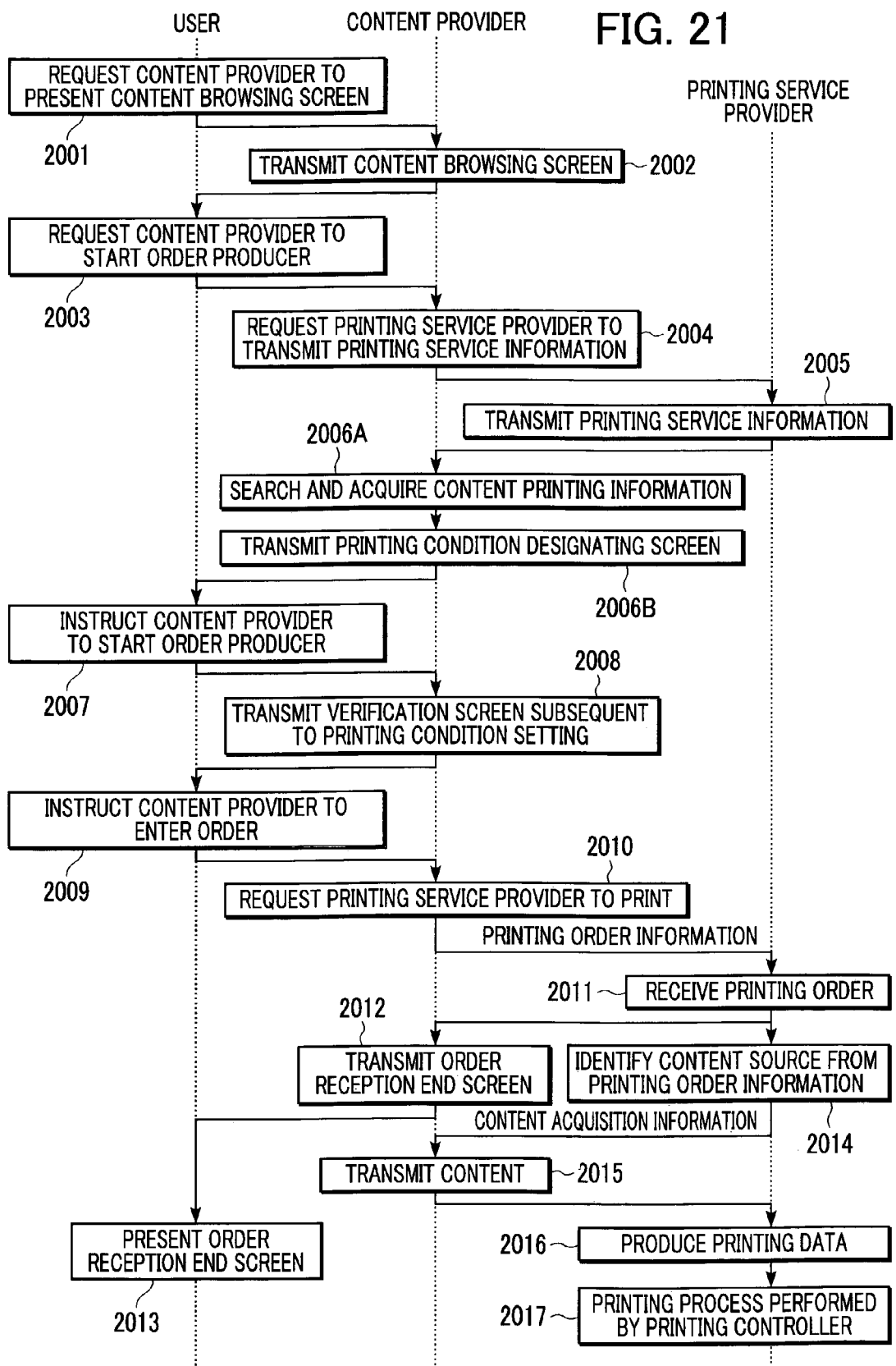

```
<HTML>
<BODY>
<table WIDTH=100%>
<tr ALIGN="CENTER">      2111
<td>
<imag SRC="CATALOG/image/mountain.jpg">
</td>
</tr>
<tr ALIGN="RIGHT">                            2112
<td>
<A  HREF="http://www.sellpc/pps/pps.exe ? NO=0001ABC0001">
        <imag SRC="image/print.jpg"></A>
</td>
</tr>
</table>
</BODY>
</HTML>
```

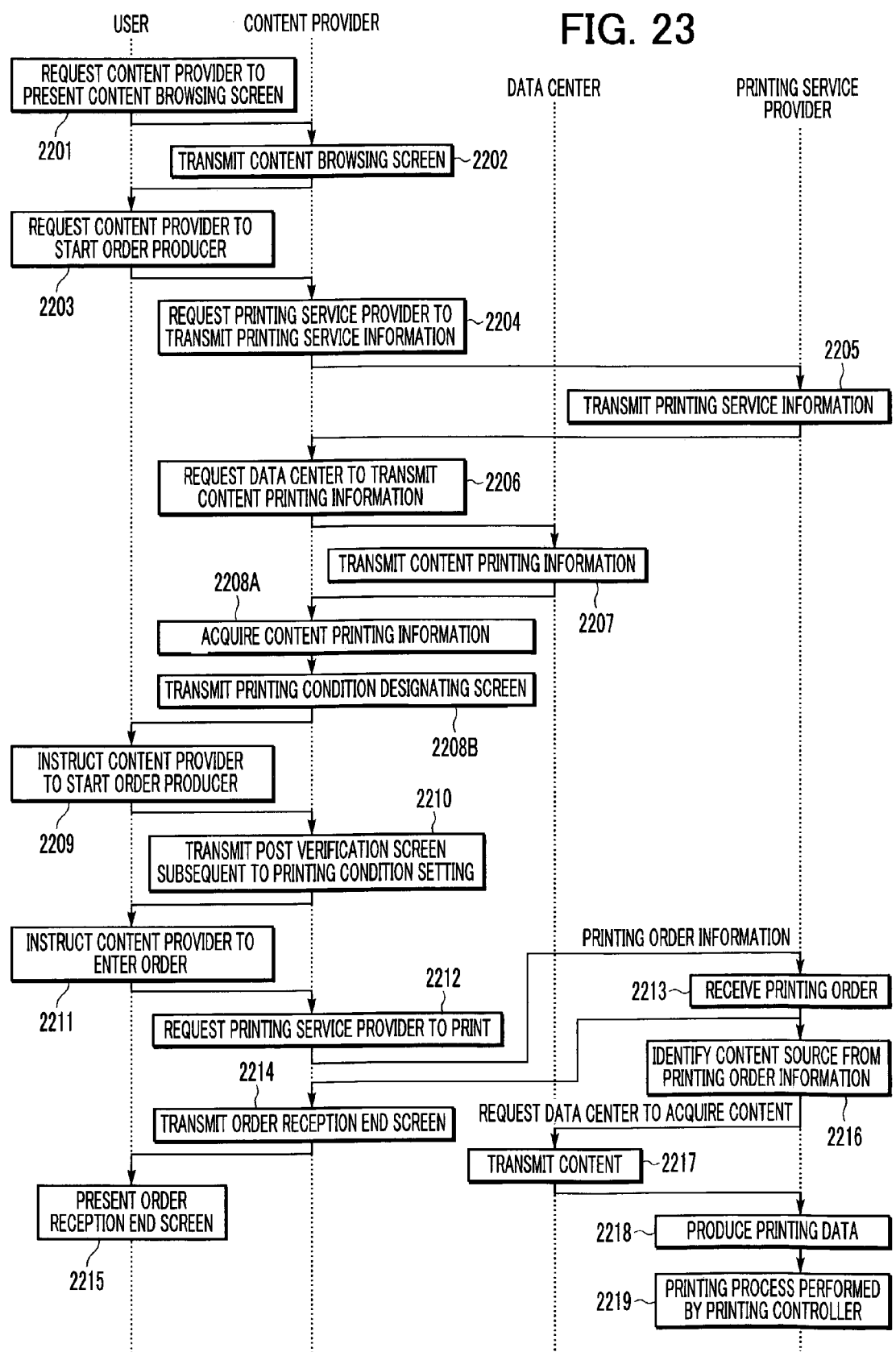

FIG. 24

STORAGE MEDIUM SUCH AS FD/CD-ROM

| DIRECTORY INFORMATION |
|---|
| FIRST DATA PROCESSING PROGRAM GROUP OF PROGRAM CODES CORRESPONDING TO STEPS IN FLOW DIAGRAM SHOWN IN FIG. 14 |
| |

MEMORY MAP OF STORAGE MEDIUM

APPARATUS, METHOD AND PROGRAM FOR PROCESSING INFORMATION ACQUIRED THROUGH A NETWORK

BACKGROUND OF THE INVENTION

1. Field of the Invention

The present invention relates to an information processing apparatus, method, computer-readable program and storage medium for printing information acquired from a server apparatus through a network.

2. Description of the Related Art

With well-equipped communication infrastructure and advanced information communication technology, users of computers easily become a provider of information services through the Internet using their own computers (information processing apparatuses). Since techniques for providing image information services through the Internet have been established, image information is easily transferred to users and exchanged between users.

Although the technique to acquire image information through the Internet is established and has found widespread use, a technique to provide image information with a property right thereof protected is still immature. Information is frequently provided in an illegal form with the copyright thereof violated.

Content providers who have copyrighted image information have not been sufficiently enthusiastic about supplying image-information providing services as a business.

The content providers may have provided image information in printed matter. But image information in printed matter can be prohibitively expensive considering investments for a facility, and maintenance of and daily utilization costs of the facility.

Users may wish to purchase and print image information. However, the sheet size and quality of printers commercially available to individuals are limited. Image information printed in a wide range of printing specifications remains out of reach for most users. On the other hand, providers who provide printing services themselves must be a holder of contents to be printed or must sometimes be licensed to use image information. The scale of business depends on the collection of contents.

Printing service providers who provide printing solutions to provide users with printing services in a diversity of printing forms other than those possible on home printers have been proposed. In this case, content providers, which provide contents but not downloading of data, do not have printing solutions.

Information is exchanged between a printing service provider and a content provider to transmit image information ordered by a user from the content provider to the printing service provider.

Such an information exchange is carried out using a single communication protocol designated by the printing service provider.

SUMMARY OF THE INVENTION

When a single communication protocol is used, a content provider is required to use a communication protocol designated by a printing service provider. If the communication protocol designated by the printing service provider cannot be used, printing solutions provided by the printing service provider are not utilized. Users may miss an opportunity offered by the printing service provider. Furthermore, the continuous and smooth operation of providing service is interrupted if a communication failure takes place in a single communication protocol.

In view of the above, it is an object of the present invention to use a number of content providers and a number of printing service providers while minimizing communication failures. To achieve this object, communication protocols are switched in accordance with communication destinations to acquire content printing information, printing service information, and content data over a network when contents are printed using many content providers and printing service providers over the network.

It is another object of the present invention to provide an easy-to-use content printing environment, which designates optimum printing conditions using printing solutions provided by the printing service providers. In this case, content printing information, printing service information, and content data are acquired from many content providers and printing service providers over the network.

An information processing apparatus of the present invention for communicating with an apparatus, which provides content printing information required to perform a printing operation based on content data, includes a communication protocol storage unit for storing information representing at least one communication protocol, which is used when data is acquired from the apparatus, a communication protocol determining unit for determining a communication protocol, which is used to acquire the data from the apparatus based on the information stored in the protocol storage unit, an acquisition unit for acquiring the content printing information from the apparatus using the communication protocol determined by the communication protocol determining unit, and a generating unit for generating data representing a screen for setting printing conditions, based on the content printing information acquired by the acquisition unit, wherein the screen for setting the printing conditions is presented based on the data generated by the generating unit.

Further objects, features, and advantages of the present invention will be apparent from the following description of the preferred embodiments with reference to the attached drawings.

BRIEF DESCRIPTION OF THE DRAWINGS

FIG. 7 illustrates content printing information stored in a content printing information storage of FIG. 5.

FIG. 8 diagrammatically illustrates a content provider managing table of FIG. 6.

FIG. 9 illustrates a major portion of an order managing table of FIG. 6.

FIG. 10 illustrates a first content printing process sequence in the network system incorporating the information processing apparatus according to an embodiment of the present invention.

FIG. 18 illustrates a structure of content printing information location data in the content provider of FIG. 1.

FIG. 19 diagrammatically illustrates in detail a structure of a content provider managing table of FIG. 17.

FIG. 20 illustrates a structure of printing order information in the information processing apparatus according to an embodiment of the present invention.

FIG. 21 illustrates a third content printing process sequence in the network incorporating the information processing apparatus according to an embodiment of the present invention.

FIG. 23 illustrates a fourth content printing process sequence in the network system incorporating the information processing apparatus according to an embodiment of the present invention.

FIG. 24 illustrates a memory map of a storage medium storing a variety of data processing programs read by the information processing apparatus according to an embodiment of the present invention.

DESCRIPTION OF THE PREFERRED EMBODIMENTS

The embodiments of the present invention will now be discussed with reference to the drawings.

First Embodiment

System Construction

Figure 1:
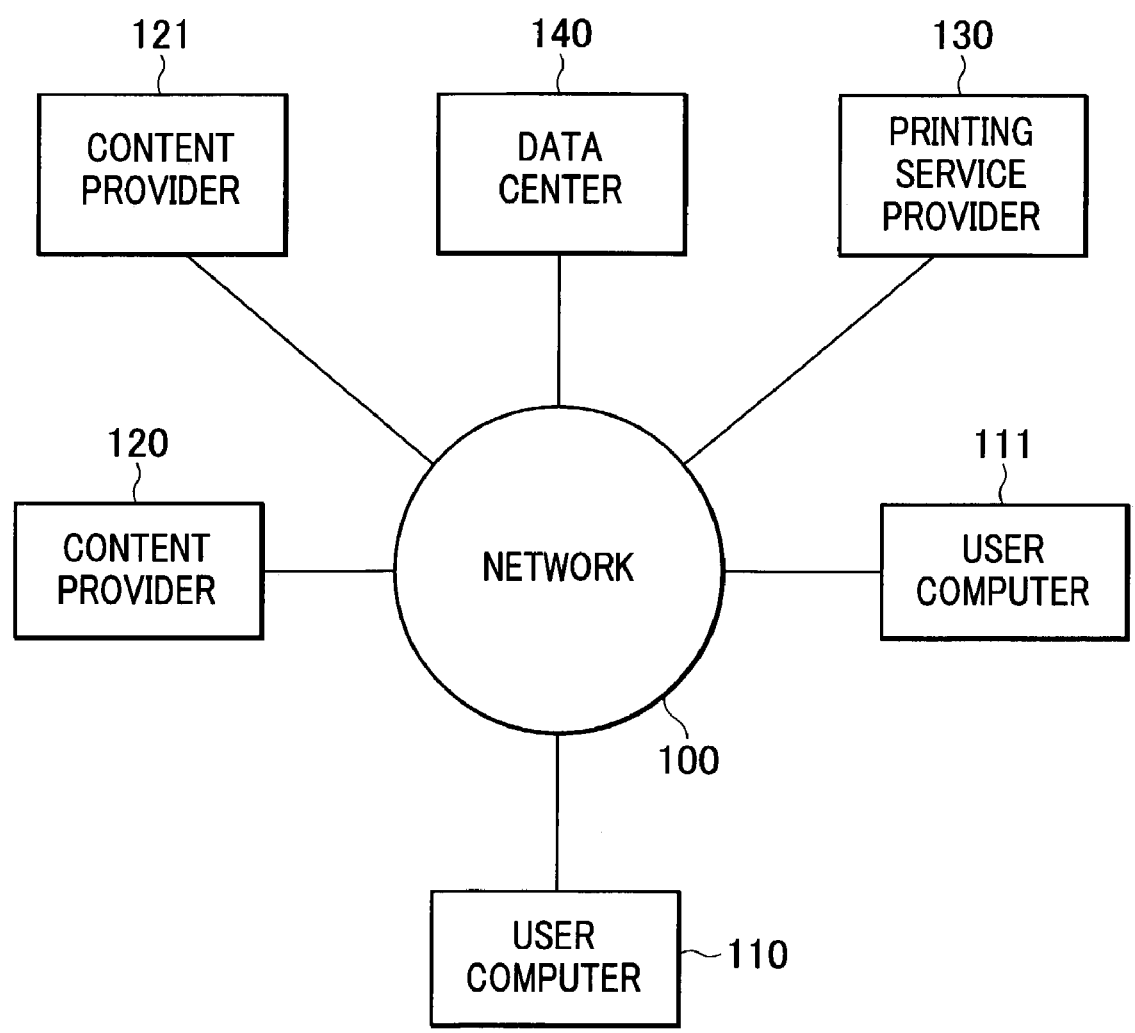
FIG. 1 is a block diagram illustrating a network system incorporating an information processing apparatus according to an environment of the present invention.

FIG. 1 is a block diagram of a first embodiment of the present invention illustrating a network system 100 incorporating an information processing apparatus of the present invention.

As shown, user computers 110 and 111 are connected to the network system 100. As will be discussed later with reference to FIG. 2, each of the user computers 110 and 111 includes a CPU (Central Processing Unit), a ROM (Read-Only Memory), a RAM (Random-Access Memory), and a HDD (Hard Disk Drive). A client, who is a user of the system, directly operates one of the user computers 110 and 111.

Each of the user computers 110 and 111 has a function to browse a document including image information, such as contents or a catalog of the contents stored in content providing computers (hereinafter referred to as content providers) 120 and 121 through the network system 100, and a function to issue an order of printing from a printing service provider 130 in response to the pressing of a printing order button contained in the document.

In the first embodiment, the number of user computers is two. The number of user computers is at least one, and there is no upper limit set on the number of computers in the present invention.

An image printing order is referred to as a printing order sometimes, or simply referred to as an order at other times.

Content providers 120 and 121 provide contents such as images and documents.

Each of the content providers 120 and 121 has a function to provide users with a document (also referred to as a content browsing screen) including image information, such as contents or a catalog of the contents through the network system 100, and a function to supply a printing service provider 130 with a content (also referred to as a commodity or body of a content) and associated information. In the first embodiment, the number of content providers connected to the network is two. The number of content providers is at least one, and there is no upper limit set on the number of content providers in the present invention.

In the first embodiment, for the convenience of explanation, one content provider operator operates one content provider. Optionally, one operator may operate two or more content providers to distribute an access load among them or to handle a plurality of types of contents.

The printing service provider computer (printing service provider) 130 performs a printing process mainly in response to a request from the user computer 110.

The printing service provider 130 supplies a document to present a printing order screen in response to a request from one of the user computers 110 and 111, organizes a printing order by receiving a print setting on the printing order screen, acquires a content from one of the content providers 120 and 121 and a data center 140, to be discussed later, in accordance with the printing order, and performs a printing process. The document presenting the printing order screen may be expressed in HTML (Hyper Text Markup Language) document data, and a browser interprets the HTML document to display the printing order screen.

In the first embodiment, for the convenience of explanation, one operator operates one printing service provider. Optionally, one operator operates two or more printing service providers to distribute an access load among them in the present invention.

The data center 140 holds the body of contents written in a document including the catalog page of the contents disclosed by the content providers 120 and 121.

The user browses a content browsing screen presenting a catalog of the contents by accessing one of the content providers 120 and 121, and places a printing order for a content listed in the content browsing screen from the printing service provider 130. The data center 140 transmits, to the printing service provider 130, data for the printing order, such as the body of the content requested by the printing service provider 130 and content printing information to be discussed later.

In the first embodiment, the number of data centers 140 connected to the network 100 is one. However, there is no particular limitation set on the number of data centers in the present invention, such that more than one data center 140 may be connected to the network 100.

In the first embodiment, for the convenience of explanation, one operator operates one data center. Optionally, one operator operates two or more data centers to distribute an access load among them in the present invention.

The network system (hereinafter simply referred to as the network) 100 interconnects the user computers 110 and 111, the content providers 120 and 121, the printing service provider 130, and the data center 140. For example, the network 100 is the Internet or a local area network (LAN). In the embodiments of the present invention, the network 100 refers to the Internet, but the scope of the present invention is such that another network system may be used for the network 100.

In the discussion of the embodiments that follows, it is assumed that the body of contents is present in the content provider 120. The content provider 121 has a catalog screen of contents, while information required for the printing order, such as the body of the contents and content printing information, which is information associated with the content, is stored in the data center 140.

The printing order placed on the content browsing screen in the content provider 121 will be discussed in connection with a second embodiment.

Figure 2:
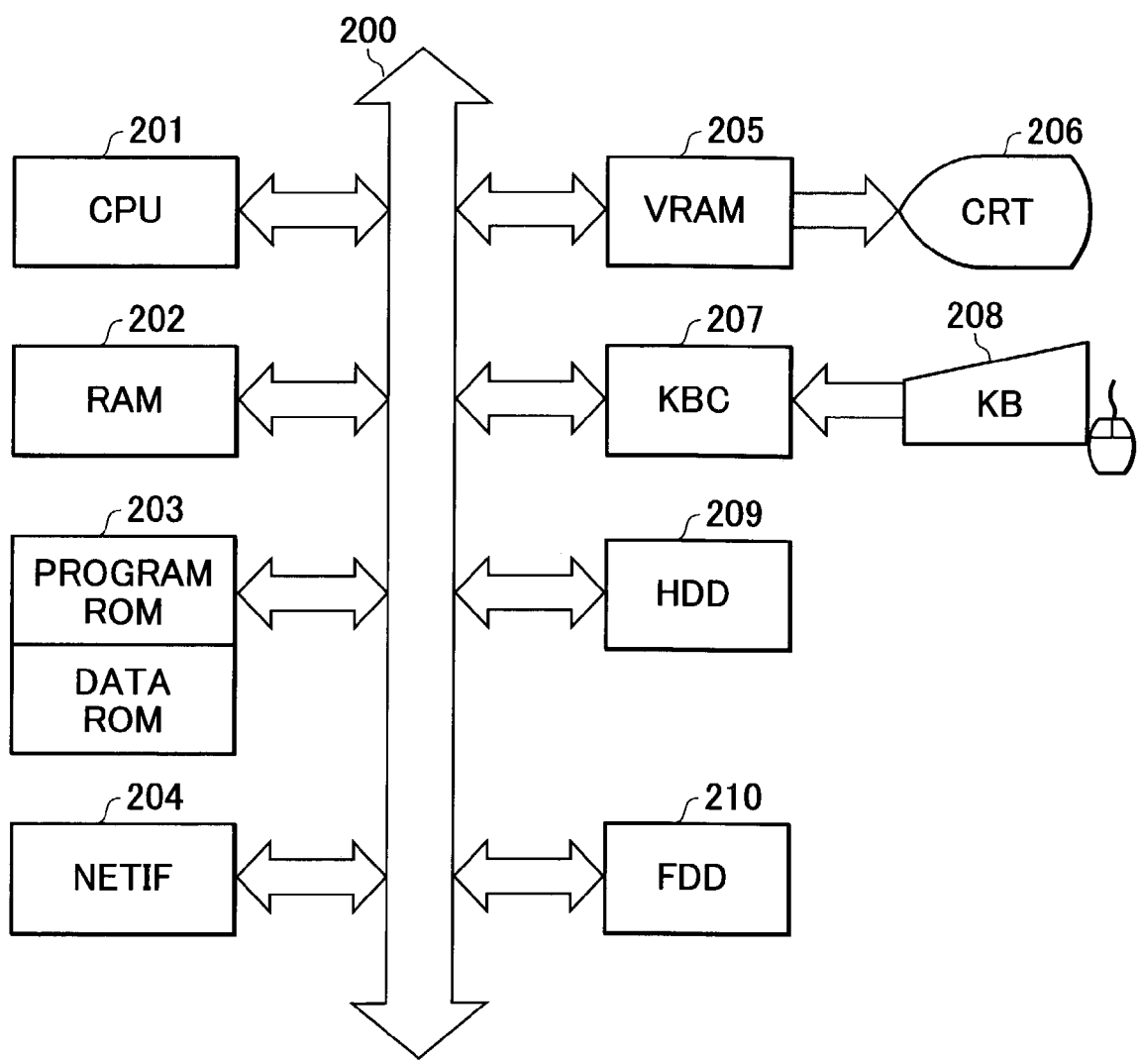
FIG. 2 is a block diagram illustrating a typical construction of the information processing apparatus of the network system illustrated in FIG. 1.

FIG. 2 is a block diagram illustrating a typical construction of the information processing apparatus incorporated in the network system 100 illustrated in FIG. 1. The construction shown here corresponds to each of the user computers 110 and 111, the content providers 120 and 121, and the data center 140. Since there is no substantial difference in the internal construction between the user computers 110 and 111, the content providers 120 and 121, and the data center 140, these units are discussed together with reference to FIG. 2.

As shown, a central processing unit (CPU) 201 generally controls the information processing apparatus.

A random-access memory (RAM) 202, as a main memory of the CPU 201, serves as an area for an executing program, a working area for the executing program, and a data area.

Read-only memories (ROMs) 203 store code for operational process steps of the CPU 201. The ROMs 203 include a program ROM storing an operating software (OS), which is a system program for controlling the information processing apparatus, and a data ROM storing information required for operating the information processing apparatus. A HDD 209 to be discussed later may be used instead of the ROMs 203.

A network interface (NETIF) 204 controls data transfer between the information processing apparatuses through the network and diagnoses connection statuses.

A video RAM (VRAM) 205 develops an image indicating the operation status of the information processing apparatus on a CRT (Cathode-Ray Tube) 206 and controls the displaying of the image.

The CRT 206 is a display unit for displaying an image.

A controller (KBC) 207 controls input signals inputted from an external input device 208 to be discussed later.

The external input device 208 receives operation inputs inputted by the user when the user operates the information processing apparatus. The external input device 208 is a pointing device such as a mouse or keyboard. Hereinafter, the external input device 208 is simply referred to as KB 208.

A hard disk drive (HDD) 209 stores application programs and image information. The application program in the first embodiment refers to a software program, which operates various processing units constituting the first embodiment.

An external input and output device 210 is a flexible disk drive or a CD-ROM drive, for example, for loading and unloading a removable disk. The external input and output device 210 is used to read an application program from a storage medium. Hereinafter, the external input and output device 210 is simply referred to as a FDD 210.

The application programs and data stored in the HDD 209 may be stored in the FDD 210.

An input/output bus 200 (serving as an address bus, a data bus, and a control bus) interconnects units.

Figure 3:
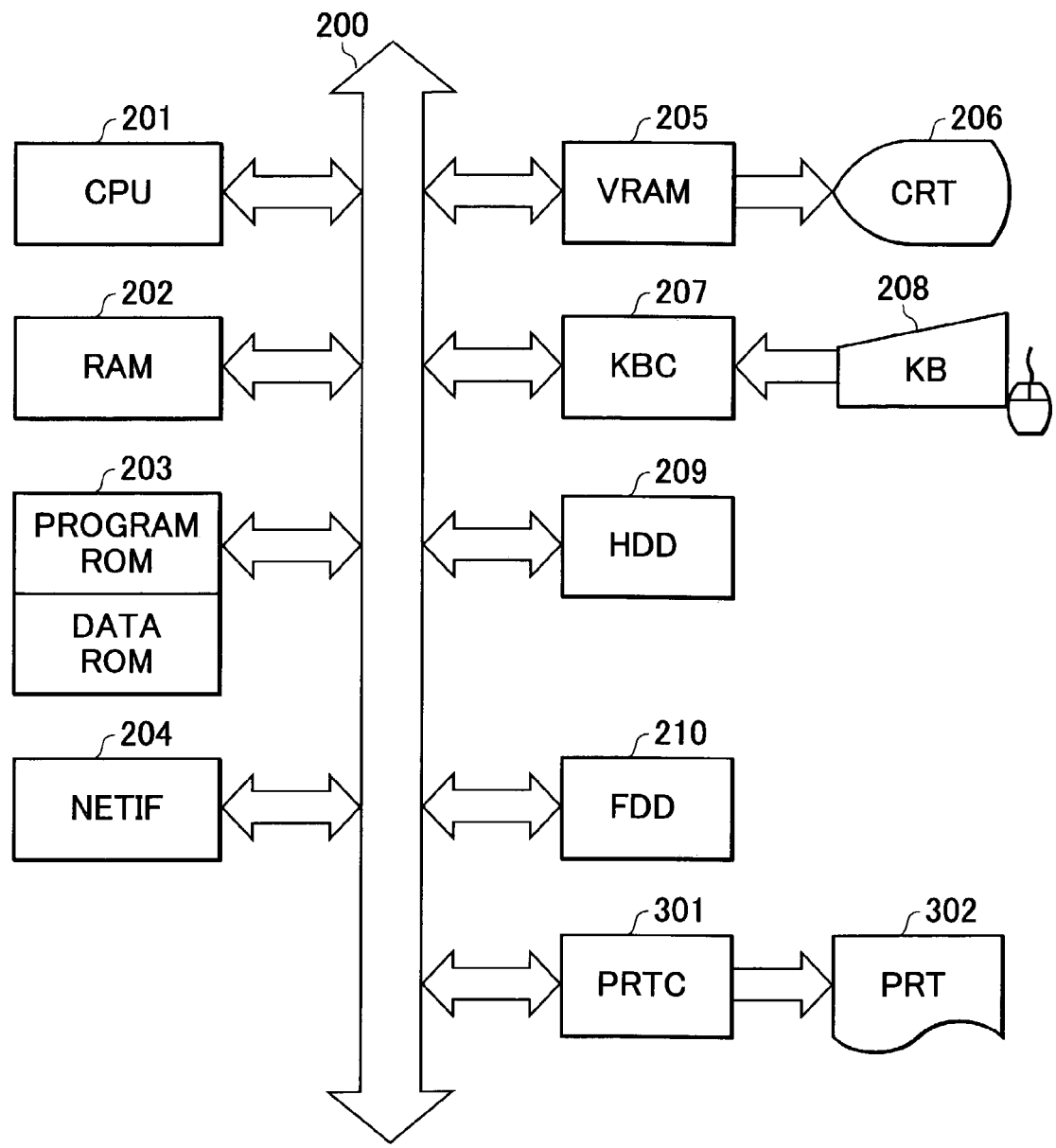
FIG. 3 is a block diagram illustrating a hardware configuration of a printing service provider of FIG. 1.

FIG. 3 is a block diagram illustrating a hardware configuration of the printing service provider 130 of FIG. 1. The printing service provider 130 includes some additional units in addition to the hardware configuration of the user computers 110 and 111, the content providers 120 and 121, and the data center 140 shown in FIG. 2. In FIG. 3, components identical to those discussed with reference to FIG. 2 are designated with the same reference numerals.

A printer controller (PRTC) 301 controls an external output device 302 and the outputting of an image thereto.

The external output device 302 is a printer, for example, and is hereinafter referred to as a PRT 302. The input/output bus 200 (serving as an address bus, a data bus, and a control bus) interconnects units, as already discussed.

In the discussion that follows, the printing service provider 130 in the first embodiment remains connected to a printer.

If the printer or another computer for connecting the printer is connected to the network 100, and if the printer is usable to perform a printing process of a printing order received by the printing service provider 130, the printing service provider 130 is identical in construction to the user computers 110 and 111, and the content providers 120 and 121 already discussed, without the need for the printer of its own.

Construction of the User Computer

Figure 4:
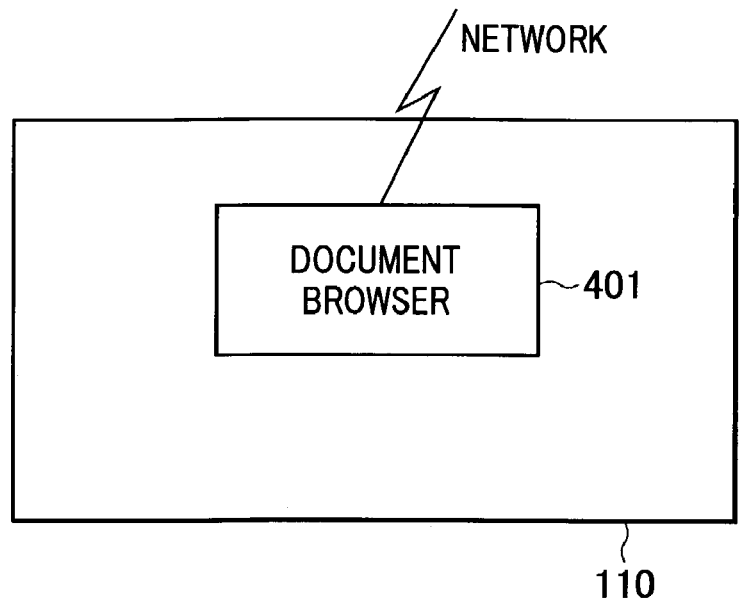
FIG. 4 illustrates a software configuration of a user computer of FIG. 1.

FIG. 4 illustrates a software configuration of the user computer 110 of FIG. 1. The user computer 111 is identical in construction to the user computer 110.

As shown, the user computer 110 contains a document browser 401 as an application program, which is read from one of the ROM 203, the HDD 209 and the FDD 210, and is developed onto the RAM 202.

The document browser 401 is an application program to receive service from the Internet through a network (e.g., a typical application program such as an Internet browser or web browser).

The document browser 401 parses a document written in the HTML, and presents buttons defined by the HTML. If a button is pressed, the document browser 401 requests one of the content providers 120 and 121 and the printing service provider 130 to transmit a document, or transmits a request to print. The document browser 401 may transmit a variety of settings performed during a printing request, including a sheet size set in the user computer.

Construction of the Content Provider and Data Center

Figure 5:
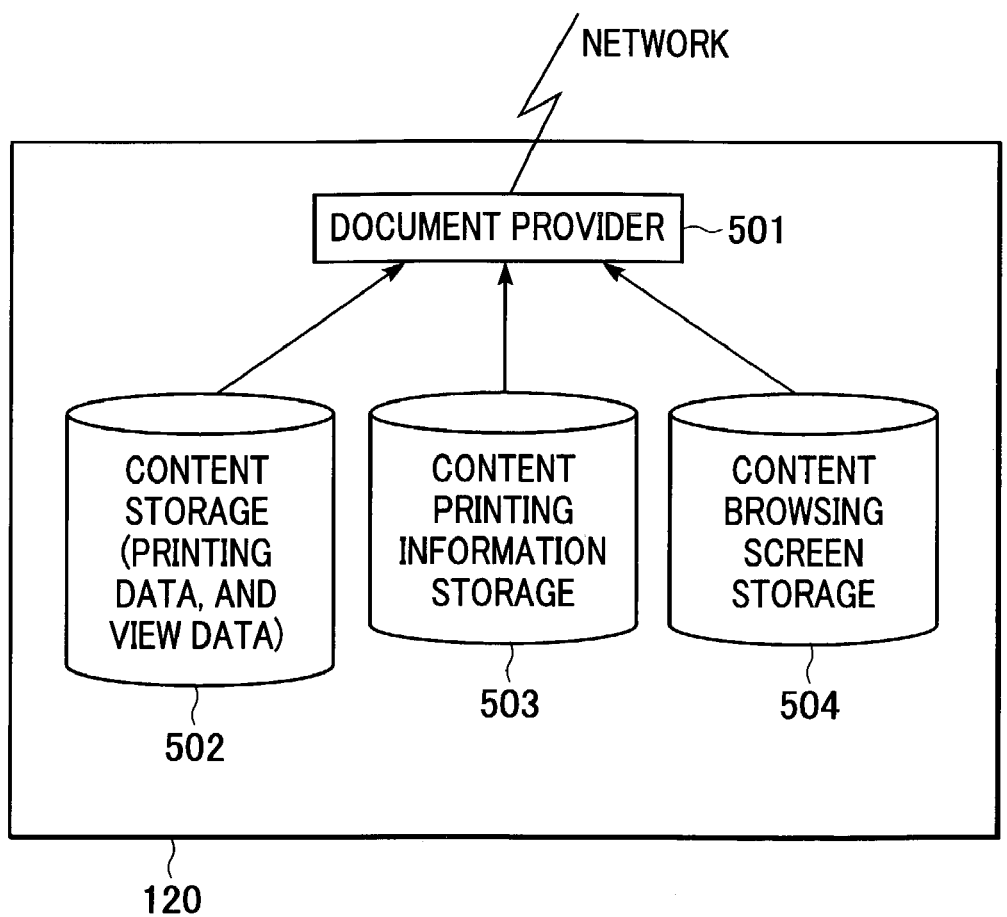
FIG. 5 illustrates processing units in a content provider of FIG. 1.

FIG. 5 illustrates processing units in the content provider 120 of FIG. 1. Since the content provider 121 and the data center 140 have a similar construction, they are also discussed with reference to FIG. 5.

As shown, a document provider 501 is an application program. The document provider 501 is read from one of the ROM 203, the HDD 209 and the FDD 210 into the RAM 202 and is developed onto the RAM 202 before use.

The HDD 209 stores data from a content storage 502, a content printing information storage 503, and a content browsing screen storage 504.

The document provider 501 responds to a request from an external computer such as one of the user computers 110 and 111 and the printing service provider 130 through a network such as the Internet, and searches data stored in the HDD 209 to be discussed later for a requested HTML document, text data, or an image data, and then transmits the HTML document, text data or an image found in the search.

The document provider 501 is generally called an Internet server program or a WWW server program. In addition to transmitting a document, the document provider 501 develops another application program stored in the HDD 209 or the like onto the RAM 202 to use that application program in response to a request from an external computer. As necessary, the document provider 501 authenticates a user ID of the user in response to a request from the outside, thereby limiting data to be transmitted.

The content storage 502 stores an image to be printed by the printing service provider 130, the body of a content such as a document, and view data and printing data, which are intended to be viewed by the user on the user computer. For example, as for an image, the data to be viewed is image data with a definition reduced down to a level at which the user still recognizes the image on the screen. As for a document, the data be viewed is image data with a definition reduced down to a level at which the user still recognizes a summary of document text and a first page thereof. In the present invention, there is no particular requirement on the data to be viewed.

The data of the content storage 502 is stored in the HDD 209. The document provider 501 searches the content storage 502 in response to a request from the external computer, such as one of the user computers 110 and 111 and the printing service provider 130, and transmits data replying to the request to the requesting external computer.

The content printing information storage 503 stores content printing information. The content printing information contains a variety of limitations relating to a content, such as a printing size and the number of prints, a variety of limitations relating to printing conditions, such as a sheet size and print quality, and information required for a printing order and a printing process. The content printing information will be discussed in detail later with reference to FIG. 7.

The data of the content printing information storage 503 is stored in the HDD 209. The document provider 501 searches the content printing information storage 503 for data in response to a request from an external computer, such as the printing service provider 130, and transmits the data to the printing service provider 130.

The content browsing screen storage 504 stores a screen through which the user computers 110 and 111 browse the data of a content stored in the content storage 502, and an HTML document expressing the screen (the content browsing screen) on which a printing request is entered.

The data of the content browsing screen storage 504 is stored in the HDD 209. The document provider 501 searches the content browsing screen storage 504 for data in response to a request from an external computer, such as the user computers 110 and 111, and transmits the data replying to the request to the external computer. The construction of the content provider 120 has been discussed.

Since the content provider 121 is treated as having the content printing information and content body stored in the data center 140 in the first embodiment, the content printing information storage 503 and the content storage 502 are not required elements. The data of the content for viewing may be stored in the content browsing screen storage 504.

In the data center 140, the document provider 501 is not necessarily a so-called WWW server. The data center 140 may use a File Transfer Protocol (FTP) server that transmits a file to the printing service provider 130. In the present invention, it is not a requirement that the data center 140 includes the content browsing screen storage 504.

Construction of the Printing Service Provider

Figure 6:
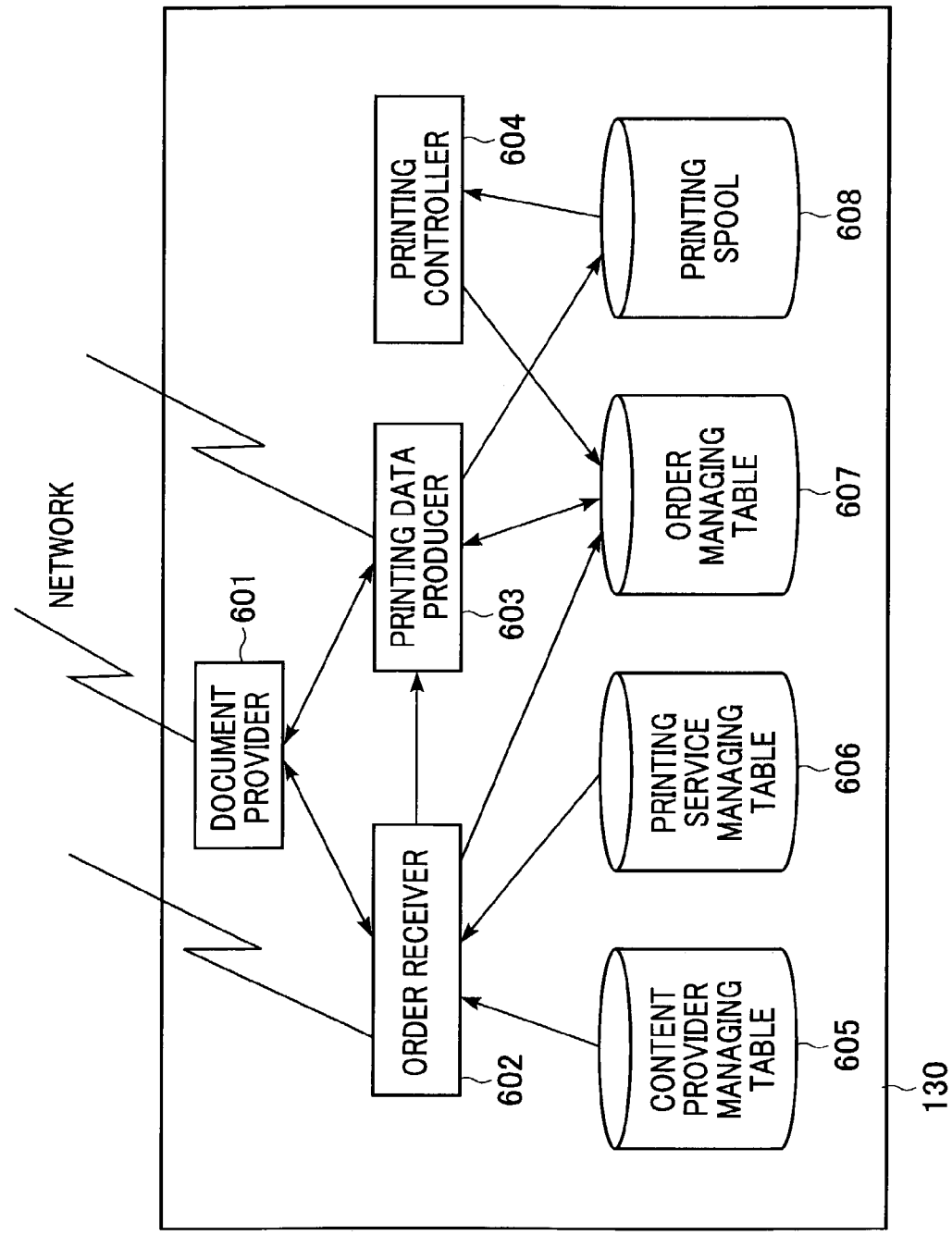
FIG. 6 illustrates processing units in the printing service provider of FIG. 1.

FIG. 6 illustrates processing units in the printing service provider 130 of FIG. 1.

As shown, a document provider 601 is equivalent to the document provider 501. The document provider 601 is an application program. The document provider 601 responds to a request from external computers such as the user computers 110 and 111 and content providers 120 and 121 through a network such as the Internet, searches data stored in the HDD 209 (to be discussed later) for a requested HTML document, text data, or an image data, and then transmits the data found in the search to the requesting external computer.

The document provider 601 is generally called an Internet server program or a WWW server program. In addition to transmitting a document, the document provider 601 develops another application program stored in the HDD 209 or the like onto the RAM 202 to use that application program in response to a request from an external computer. As necessary, the document provider 601 authenticates a user ID of the user in response to a request from the outside, thereby limiting data to be transmitted.

An order receiver 602 includes a group of application programs receiving printing orders of contents.

The order receiver 602 has three major functional phases. In a first phase, the order receiver 602, initiated in response to a printing order issued by one of the user computers 110 and 111, identifies a content provider having a requested content, acquires the content printing information required for the reception of the order of the identified content, from one of the content provider 120 and the data center 140, and further acquires required information from a printing service managing table 606 (to be discussed later). Furthermore, the order receiver 602 generates order information in an order managing table 607 while generating an HTML document for displaying a printing condition designating screen receiving a variety of settings during printing. The generated HTML document is then transmitted to one of the user computers 110 and 111, which has issued the request.

In a second phase, the order receiver 602 is initiated in response to a printing condition setting request, which is issued by one of the user computers 110 and 111, i.e., the destination of the HTML document. The printing condition setting request is issued together with a variety of printing conditions set in the printing condition designating screen by one of the user computers 110 and 111. The order receiver 602 generates a printing order and transmits an HTML document for displaying a printing verification screen to the user computers 110 and 111.

In a third phase, the order receiver 602 is initiated in response to the reception of a printing order end notice issued by the user computers 110 and 111 in a verification process on the printing verification screen. The order receiver 602 then initiates a printing data producer 603 which performs a printing preparation operation (to be discussed later).

The order receiver 602 discussed above is generally called a CGI program. In response to a request from the external computer, the document provider 601 develops the CGI program from within the HDD 209 onto the RAM 202 to use the CGI program. The printing data producer 603 is an application program. The order receiver 602 reads the printing data producer 603 from within the HDD 209 and develops the printing data producer 603 onto the RAM 202 before use.

Upon being initiated by the order receiver 602, the printing data producer 603 extracts a record to be produced as printing data, from the order managing table 607, and acquires the body of the content to be printed in accordance with the record from one of the content provider 120 and the data center 140. The printing data producer 603 produces other data required for printing and stores the other data in a printing spool 608 (to be discussed later).

A printing controller 604 controls a printing process of the printing data in the printing spool 608 in accordance with the order managing table 607. The printing controller 604 is an application program which is read from within the HDD 209 and developed onto the RAM 202 before use. The printing controller 604 is initiated by the printing data producer 603. Furthermore, the printing controller 604 may be initiated at any time by the user of the printing service provider 130 or may be automatically initiated at regular intervals.

A content provider managing table 605, having a data structure shown in FIG. 8, stores addresses of the content provider and the data center, and the location of the content printing information.

The printing service managing table 606 stores all settings of a printing service provided by the printing service provider 130. The settings include the type of a printer, printing conditions (e.g., layout information such as sheet size, number of prints, sheet quality, definition, position, scale, both side printing, alignment direction of stitching, and binding information subsequent to printing, such as binding and lamination, and framing), and pricing information for printing.

The printer registered in the printing service managing table 606 performs a printing process of the printing order received by the printing service provider 130. The printer may be one of the printer connected to the PRTC 301 of the printing service provider 130, a printer directly connected to the network 100, or a printer connected to a computer other than the printing service provider 130 connected to the network 100.

The order managing table 607 stores the printing order, information associated with the printing order, and the status of progress of the printing, as will be discussed in detail with reference to FIG. 9.

The printing spool 608 stores the body of the content that answers the printing order and data required to carry out the printing.

All units 601-604 are application programs, and are read from one of the ROM 203, the HDD 209, and the FDD 210, and are developed onto the RAM 202 before use. All units 605-608 are data stored in the HDD 209.

Content Printing Information

The content printing information stored in the content printing information storage 503 in one of the content provider 120 and the data center 140 is discussed below.

As already discussed, the content printing information is information required for the printing order and printing process when the content of the content provider is printed. In accordance with the present invention, the content printing information is not limited to any particular data format or description format. A printable content stored in the content storage 502 must have corresponding content printing information. The method of transferring the content printing information to the content provider is not limited to any particular one. To clarify the present invention, it is assumed that a text file describing the content printing information corresponding to a printable content is stored in the content printing information storage 503 in the first embodiment.

Described in the content printing information relating to the content are (1) a content code that uniquely identifies the content at least within the content provider, (2) a content type such as a document or image, (3) a location where a content body is present, (4) a location where view data is present, (5) pricing information, (6) overlay information, including an indication of copyright and a serial number, which must be overlaid when the content is printed, and (7) overlay position information indicating an overlay position of the overlay information.

The content printing information to limit the printing of the content includes (1) size limiting information for limiting the minimum and maximum size of the content during printing, (2) sheet size limiting information for limiting a printing sheet size, (3) sheet quality limiting information for limiting the quality of a paper sheet, (4) number of print limiting information for limiting the maximum number of prints, and (5) printer limiting information for limiting the type of a printer that performs a printing process.

As necessary, the content printing information further contains (1) default settings for printing, (2) payment information for the content, (3) payment information for prints, (4) identification information of a user, and (5) identification information of the printing order managed by the content provider.

FIG. 7 illustrates the content printing information stored in the content printing information storage 503 of FIG. 5.

As shown, content printing information 700 is supplied in a text data file. The content printing information 700 starts with an index enclosed in brackets "[ ]", followed by "setting item=set value".

A content information section 701 describes information relating to the content. Two indexes to indicate the content information section 701 are present in the first embodiment. A first index [CONTENTS] describes a content code, and a second index [OVERLAY] describes a string and position of overlay characters which are printed in overlay on the content during the printing.

Referring to FIG. 7, five settings are present under the first index. The setting "CONTENTSCODE=ABC0001" means that the content of the content printing information 700 is identified by a content code "ABC0001".

The setting "TYPE=IMAGE" relates to the type of the content, and means here that the "ABC0001" is an image.

The setting "ADDRESS=/PRINTDATA/abc0001.jpg" means that the location of a file "abc0001.jpg", which is the body of the content, is at "/PRINTDATA/abc0001.jpg".

The setting "PREVIEW=/THMB/abc0001_pre.jpg" means the location of the data "abc0001_pre.jpg" for preview is at "/THMB/abc0001_pre.jpg".

The body of the content and the view data are used together with the content provider managing information (to be discussed with reference to FIG. 8) to identify an actual source.

The last setting "PRICE=30" in the index [CONTENTS] means that the price of the content is $30. In the first embodiment, the unit of currency is omitted. Optionally, the unit of currency may be displayed if a plurality of units of currency are available.

The other index "[OVERLAY]" of the content information section 701 describes additional data, which is printed together with the content when the content is printed, and the location of the additional data.

The setting STRING="COPYRIGHT" means the additional data. A string of characters enclosed in double-quote symbols (" ") are printed together with the content. The setting HORIZONTAL=CENTER, and VERTICAL=UNDERBOTTOM defines the location where the additional data is provided. As shown in FIG. 7, the additional data is located at a horizontally central and vertically bottom position. A printing information section 702 describes the limiting information of the content during printing.

The printing information section 702 in the first embodiment is represented by an index "[PRINT LIMIT]".

As shown in FIG. 7, three setting items are presented under the index "[PRINT LIMIT]". In the content printing information, setting items other than the three settings items shown in FIG. 7 may be available. Information omitted here in the setting in the first embodiment has no limitation thereon or has default values set beforehand by the printing service provider 130.

The setting MAXSIZE=400*290 means that the actual printing size of the content is limited to a dimension 400 (mm) wide and 290 (mm) high.

The setting MAXPAPER=A3 means the maximum sheet size usable during printing is limited to A3.

The setting MAXVOLUME=100 means that the number of prints per printing order is limited to 100.

A miscellaneous information section 703 lists miscellaneous information of the content printing information, not covered by the information relating to the content and the limiting information of the printing of the content. The miscellaneous information section 703 is represented by an index "[ETC]" in the first embodiment.

Referring to FIG. 7, the setting "PAYMENT=FINISHED" means that the bill for the use of the content has already been paid.

The content printing information in the first embodiment has been discussed with reference to FIG. 7. Information that could be omitted is omitted in not only the printing information section 702 but also the content information section 701 and miscellaneous information section 703 as long as such omission causes no inconvenience in the printing order and printing process.

Content Provider Managing Table

The content provider managing table 605 of the printing service provider 130 is discussed below.

The content provider managing table 605 stores and manages the locations of the content provider 120 and the data center 140, and storage location of the content printing information in these computers. The content provider managing table 605 is held in the HDD 209. The content provider managing table 605 may alternatively be configured using a database system.

When performing an order reception process, the order receiver 602 searches the content provider managing table 605. By referencing the search result, the order receiver 602 performs the order reception process of a content present in an external computer.

FIG. 8 illustrates an example of the content provider managing table of FIG. 6.

As shown, the content provider managing table 605 manages four items 801-804 in a single record (hereinafter referred to as a content provider managing record).

A content provider code 801 is issued beforehand and stored for each content provider to identify the content provider.

A base address 802 represents the locations of the content provider 120 and the data center 140 over the network 100.

Since network linking is carried out using the Internet in the discussion of the first embodiment, the base address 802 lists a URL (Uniform Resource Locator), which is typically used to represent a location in the Internet environment.

A content printing information path 803 stores a location of the content printing information storage 503. The content printing information path 803 is expressed by a relative path with respect to the base address 802.

A usable protocol 804 stores communication protocols, which are used to acquire the content printing information and content data from the content provider 120 and the data center 140. The usable protocol 804 stores a plurality of communication protocols by separating the protocols with delimiters. The delimiters in the first embodiment are a comma "," character. If a plurality of communication characters are listed, a leftward communication protocol has priority.

The communication protocols listed in the usable protocol 804 are compatible with the content provider 120, the data center 140, and the printing service provider 130.

A parameter provided at the start of the order receiver 602 identifies the content provider code 801, and a filename is attached to the content printing information so that uniqueness is assured by the content code. The base address 802 and the content printing information path 803 in a record searched according to the content provider code 801 are combined. Furthermore, the content printing information file is combined with the result of that combination. The location of the content printing information replying to the printing order is thus identified. The communication protocol described in the usable protocol 804 is used to acquire the content printing information from the location of the content printing information identified in the content provider 120 and the data center 140.

Data of the content provider managing table 605 in the first embodiment is discussed below.

A content provider managing record 811 shown corresponds to the content provider 120. The content provider managing record 811 indicates "001" for the content provider code 801 issued beforehand, "http://www.sellpc" for the base address 802, and "/info/printinfo" for the content printing information path 803, and "HTTPs" and "HTTP" for the usable protocol 804.

A content provider managing record 812 shown corresponds to the content provider 121. The content provider managing record 812 indicates "002" for the content provider code 801 issued beforehand, "http://www.hanbai_Stock" indicating the data center 140 for the base address 802, and "/printinfo" for the content printing information path 803, and "FTP" and "HTTP" for the usable protocol 804.

The order receiver 602 in the printing service provider 130 having the content provider managing records 811 and 812 generates the content printing information location. The generation method is discussed below.

At startup, the order receiver 602 receives and parses a parameter that is handed over at the startup. If the result of parsing the parameter received at the startup is a content provider code "001" and a content code "ABC001", the content provider records having the content provider code 801 matching "001" in the content provider managing table 605 are further searched to identify the content provider managing record 811. The order receiver 602 acquires the content provider managing record 811, and combines the base address 802, the content printing information path 803, and the content code into a content printing information path corresponding to the content responsive to the printing order.

For example, if the content printing information filename is a content code ending with ".inf" as an file extension, the location of the content printing information of the content becomes "http://www.sellpc/info/printinfo/ABC001.inf".

In the base address 802 in the first embodiment, the HTTP protocol is a standard communication protocol. The above discussion is also based on the assumption that the HTTP protocol is used as a standard communication protocol. If a communication protocol other than the HTTP protocol is used as a standard communication protocol, the storage content in the base address 802 is based on a description of a base position in accordance with that communication protocol. If a plurality of protocols are stored in the usable protocol 804, the address stored in the base address 802 is converted in response to the communication protocol to acquire data in accordance with the communication protocol stored in the usable protocol 804. The method of applying the communication protocol is applicable not only to the acquisition of the content printing information but also to the acquisition of other information such as content data.

Order Managing Table

The order managing table 607 in the printing service provider 130 will now be discussed.

The order managing table 607 manages the location of the content to be printed in response to the printing order, the information required to print, and the status of progress in the execution of the printing order. The order managing table 607 is stored in the HDD 209. The order managing table 607 may also be configured using a database system.

FIG. 9 illustrates a major portion of the order managing table 607 illustrated in FIG. 6. In the first embodiment, the order managing table 607 includes one record per printing order.

As shown, an order code 901 uniquely identifies the printing order placed from the printing service provider 130. The order code 901 is issued at the startup of the order receiver 602, and is used to identify the printing order when the order receiver 602, the printing data producer 603, and the printing controller 604 perform the processes thereof.

A content provider code 902 indicates the code of the content provider holding the content to be printed in response to the printing order. The content provider code 902 is determined by parsing the parameter that is handed over to the order receiver 602 at the startup thereof. The content provider code 902 is stored together with the order code when the order code is issued.

A content address 903 indicates the location of the body of the content in an external computer, such as one of the content provider 120 and the data center 140 from which the body of the content to be printed in response to the printing order is collected. The content address 903 is extracted from the content printing information and stored when the order receiver 602 acquires the content printing information from one of the content provider 120 and the data center 140.

A status 904 manages the status of progress of the printing order. In the first embodiment, the status 904 stores the following four statuses: (1) an "ordering in progress" status in which the printing order is being received, (2) an "image under production" status in which the printing data producer 603 currently produces an image, (3) a "ready for printing" status in which the preparation for the printing process is completed, with the content and other information required for printing stored in the printing spool 608, and (4) a "printed" status in which the printing controller 604 has printed the content.

The construction of the records of the order managing table 607 has thus been discussed.

The order managing table 607 further stores, in a single record, information about printing and a printing order such as an output printer, sheet size, sheet quality, number of prints, orderer, and payment in addition to the items 901-904. In accordance with the present invention, optionally, components forming one record in the order managing table 607 may be stored in separate tables. For example, information such as the name of the orderer of the printing order loosely related to the printing process is stored in a table different from the table of the information related to the printing data such as the content address 903. Furthermore, the status of progress of the printing order may be stored in a separate table. A plurality of tables may be managed using the order code as a key.

Returning to FIG. 9, records 911-914 are shown in the order managing table 607. Hereinafter, those records are referred to as "order managing record 911", for example.

Process Flow of the System

The process flow of the first embodiment of the present invention will now be discussed with reference to FIG. 10 and other drawings.

FIG. 10 illustrates a first content printing process sequence in the network system incorporating the information processing apparatus of the present invention. The first content printing process sequence is carried out by the user computer 110, the content provider 120, and the printing service provider 130 illustrated in FIG. 1.

It is assumed in the following discussion that the user views the content browsing screen on the content provider 120 using the user computer 110, and places a printing order from the printing service provider 130.

The user transmits a request to present a content browsing screen to the content provider 120 using the document browser 401 in the user computer 110. The request designates a URL of the content browsing screen desired by the user in accordance with the HTTP protocol. The user may directly input the URL to the document browser 401 using the KB 208. The URL may also be entered when the user selects a link on the screen presented by the document browser 401 in accordance with the HTML (step 1001).

The request to present the content browsing screen issued by the user computer 110 is transmitted through the network 100 and received by the document provider 501 in the content provider 120 through the NETIF 204. Upon receiving the request, the document provider 501 retrieves an HTML document corresponding to the designated URL from the content browsing screen storage 504. The document provider 501 further retrieves the view data linked to the HTML document from the content storage 502. The HTML document and the view data are then transmitted to the user computer 110 (step 1002).

The document browser 401 in the user computer 110 receives the HTML document and view data, thereby presenting the content browsing screen in accordance with the HTML document and view data. The content browsing screen is discussed below with reference to FIGS. 11A and 11B.

Figure 11A:
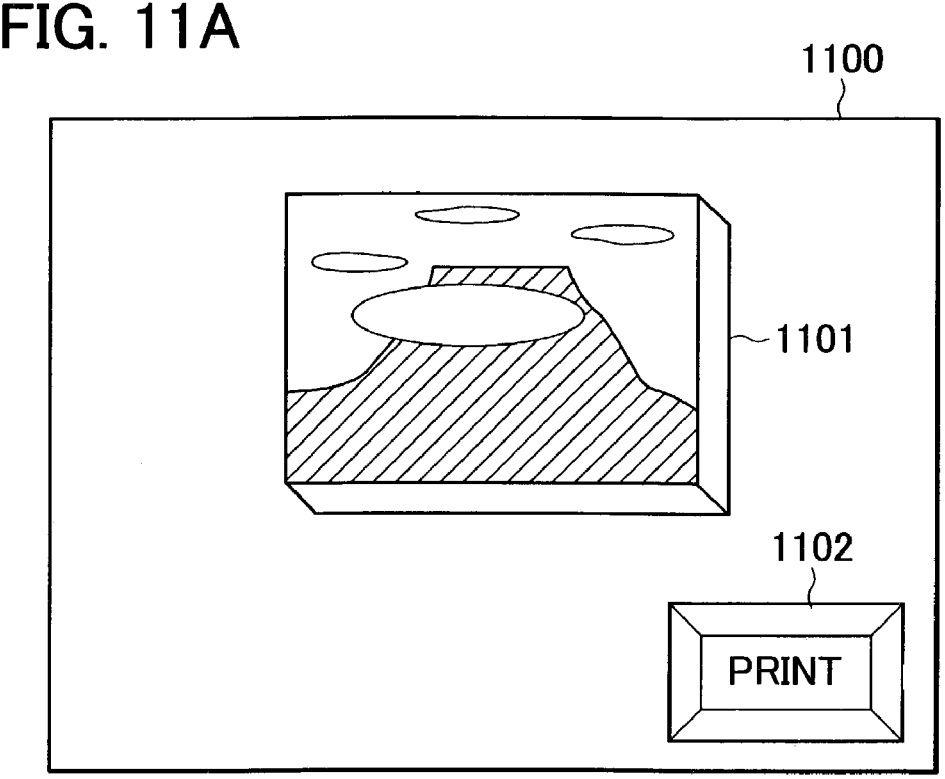
FIG. 11A illustrates a content browsing screen presented on the user computer of FIG. 1.
Figure 11B:
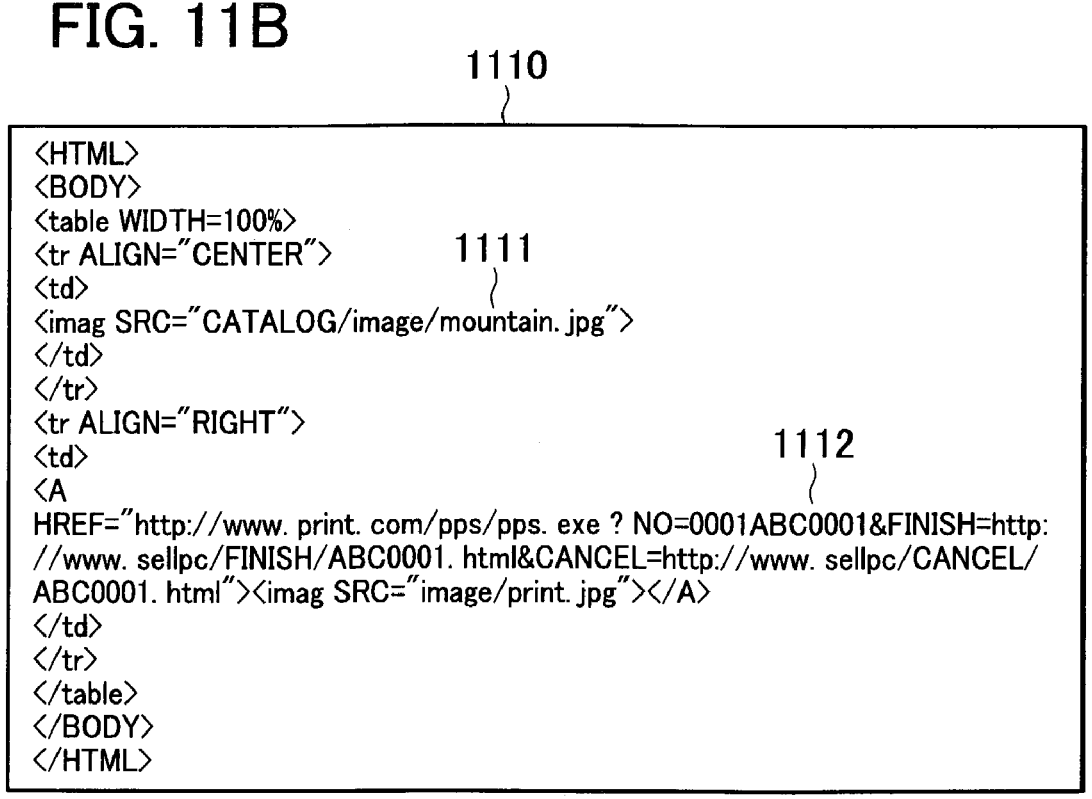
FIG. 11B illustrates an HTML document transmitted by the content provider to display the browsing screen.

FIG. 11A illustrates a content browsing screen 1100 presented on the user computer 110 of FIG. 1 and FIG. 11B illustrates an HTML document transmitted by the content provider 120 to display the browsing screen.

As shown, the content browsing screen 1100 is presented on the user computer 110 in the first embodiment.

A preview view image 1101 is displayed in accordance with view data.

A print request button 1102 appearing on the screen is used to request the printing service provider 130 to print a content.

An HTML document 1110 describes the layout and link of the content browsing screen 1100.

A view presentation designating message 1111 has a description to present the browsing screen. In the first embodiment, the view presentation designating message 1111 describes the location of the view data and image filename. A print request button display and operation command message 1112 describes the displaying of the print request button and an operation command to the document browser 401 when an operation command is issued by clicking the print request button, for example.

A description of http://www.print.com/pps/pps.exe in the print request button display and operation command message 1112 is an initiation command portion to initiate a CGI program, i.e., the order receiver 602 in the printing service provider 130. A portion "NO=0001ABC0001" is a first parameter at the startup of the content storage 502. A plurality of parameters are designated using "&", and a second parameter is "FINISH=http//www.sellpc/FINISH/ABC0001.html.

A third parameter is "CANCEL=http://www.sellpc/CANCEL/ABC0001.html". The first parameter in the first embodiment includes the content provider code stored in the content provider code 801 in the content provider managing table 605 and the content code stored in the content printing information 700.

The second and third parameters represent default screens in the content provider to which the content browsing screen defaults back to when the order reception process ends. The second parameter represents the default screen when the order reception process normally ends. The third parameter represents the default screen when the order is canceled by the user or is not correctly received due to communication problems. In the first embodiment, the HTML document is called by the HTTP protocol.

The second and third parameters are stored as text files in a working area of the HDD 209 for future reference. The second and third parameters are used in a process to be discussed later.

Returning to FIG. 10, the user clicks the print request button 1102 using the KB 208 when the content browsing screen 1100 is presented and the user desires the printing of the body of the content of the preview image 1101. In response to the clicking of the print request button 1102, the document browser 401 transmits the request to initiate the order receiver 602 to the printing service provider 130 as described in the print request button display and operation command message 1112 (step 1003).

Upon receiving the request to initiate the order receiver 602 and the parameters, the document provider 601 in the printing service provider 130 initiates the order receiver 602, and then hands the parameters to the order receiver 602.

The order receiver 602 parses the parameters, thereby identifying the content provider code and the content code from the first parameter, and searches the content provider managing table 605 using the content provider code identified by the parameter. The order receiver 602 generates the content printing information path based on the record found in the search and the content code identified by the parameter (step 1004A). The second and third parameters are stored in the working area of the HDD 209 as the text file. Using the generated content printing information path, the order receiver 602 requests the content provider 120 to acquire the content printing information 700 (step 1004B).

When the request to acquire the content printing information 700 is transmitted, the communication protocol specified in the usable protocol 804 corresponding to the content provider 120 stored in the content provider managing table 605 is used.

The information acquisition process performed with respect to the content provider 120, including step 1004B, will be discussed further later.

The document provider 501 in the content provider 120 receives the request to acquire the content printing information. In response to the request, the document provider 501 transmits the content printing information to the printing service provider 130 (step 1005).

The order receiver 602 in the printing service provider 130 issues a new order code, and generates a new record as described in the order managing record 914 (step 1006A). The order code 901, the content provider code 902, and the content address 903 acquired from the received content printing information are stored in the new record of the order managing table 607. The status 904 is set to "ordering in progress".

The order receiver 602 acquires the printing information section 702 in the content printing information 700, acquires, from the printing service managing table 606, setting items falling within the limit range described in the printing information section 702, and describes the setting items in an HTML document for presenting a printing condition designating screen.

Like the content printing information, the order receiver 602 acquires the view data from the view data address stored in the content information section 701 using the communication protocol stored in the usable protocol 804 corresponding to the content provider 120. If the overlay information is present, the combination operation is performed in accordance with the overlay information. Resulting information is then stored in the working area in the HDD 209 as a view image to be displayed in a printing condition designating screen to be discussed later. The information indicating the location of storage is added at a predetermined position in the HTML document for presenting the printing condition designating screen. A filename is attached to the overlay information to permit the overlay information to be searched in the order code in the printing spool 608 or in the order managing table 607.

The HTML document described to present the printing condition designating screen is transmitted to the user computer 110 through the document provider 601 (step 1006B).

The document browser 401 in the user computer 110 displays the printing condition designating screen based on the received HTML document.

Figure 12:
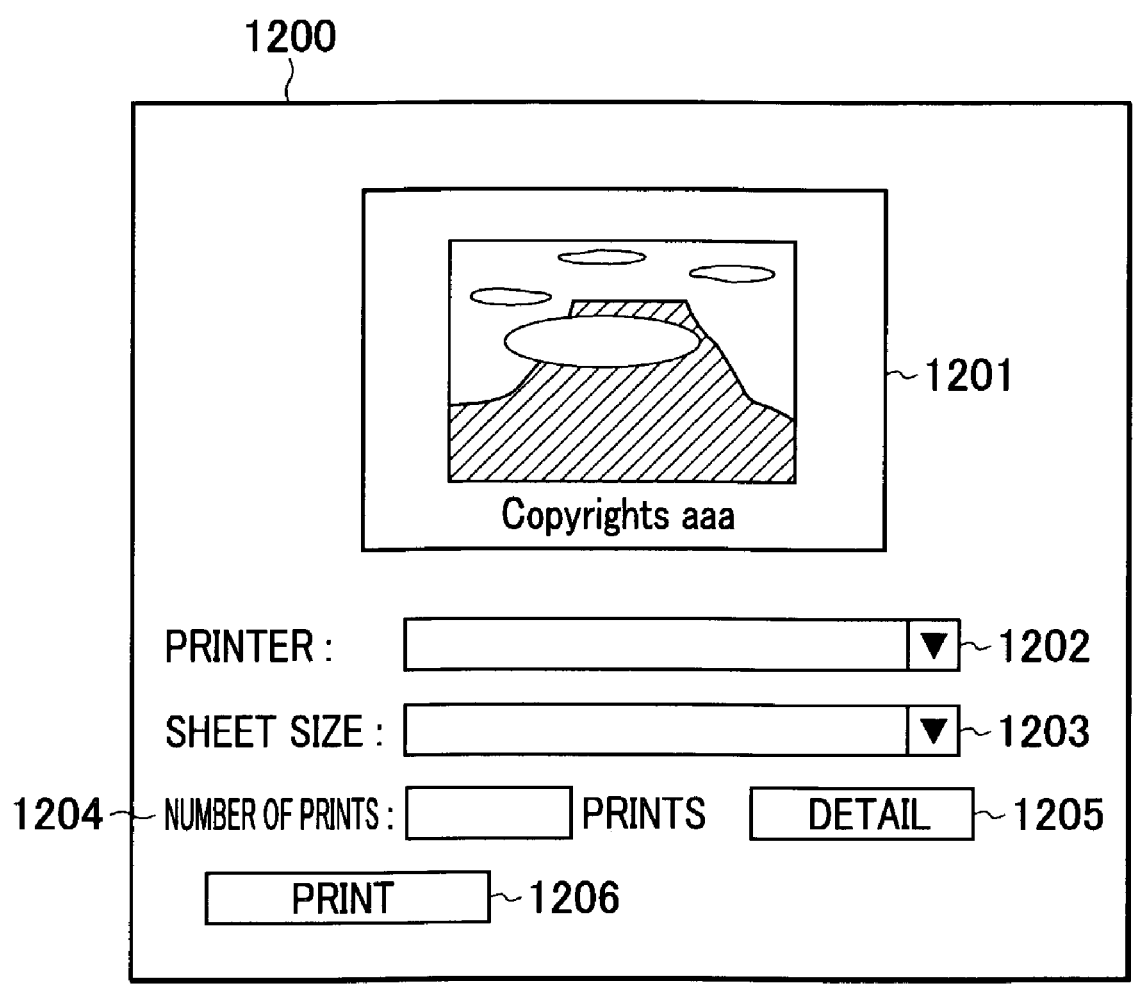
FIG. 12 illustrates a printing condition designating screen presented by a document browser in the user computer of FIG. 1.

FIG. 12 illustrates a printing condition designating screen 1200 presented by the document browser 401 in the user computer 110 of FIG. 1.

As shown, the printing condition designating screen 1200 appears in the first embodiment.

A preview image 1201 of the content is shown on the printing condition designating screen 1200. The preview image 1201 is in a state that reflects the overlay information from the order receiver 602. Specifically, the preview image 1201 provides a preview of an image to be printed.

A printer selection box 1202 is used to select a printer to print a content. The order receiver 602 selects printers that work, based on the content printing information 700 and the printing service managing table 606, and embeds a list of the printers into the HTML document. The user thus selects one of the printers from the printer selection box 1202.

A sheet size selection box 1203 is used to select a sheet size on which the content is to be printed. The order receiver 602 selects printable sheet sizes, based on the content printing information 700 and the printing service managing table 606, and embeds a list of the printable sheet sizes into the HTML document. The user thus selects one of the printable sheet sizes from the sheet size selection box 1203. Also shown is a number of prints designating box 1204.

A detail setting link button 1205 is used to call a detail setting screen. Detail settings, such as scale expansion, scale contraction, and quality of printing sheets, other than the printing conditions set in the printing condition designating screen 1200, are set in the detail setting screen. Also shown is a print order button 1206.

Returning to FIG. 10, the first content printing process sequence is discussed further.

The user sets the output printer, sheet size, and number of prints using the printing condition designating screen 1200 indicated by the document browser 401 in the user computer 110. As necessary, the user sets the printing conditions by calling the detail setting screen by clicking the print order button 1206, entering a detail setting, and then returning to the printing condition designating screen 1200.

After verifying the settings, the user clicks the print order button 1206. In response to the clicking of the print order button 1206, the document browser 401 transmits an initiation command to the order receiver 602 in the printing service provider 130, which is a link destination described in the HTML document. Also transmitted during the transmission of the initiation command are the printing condition designating screen 1200, the printing conditions set in the detail setting screen, and the order code embedded beforehand in the printing condition designating screen 1200 (step 1007).

The document provider 601 in the printing service provider 130 re-initiates the order receiver 602.

The order receiver 602 searches the order managing table 607 for the record having the order code in the parameter, and sets the printing condition in the record found in the search. The order receiver 602 transmits an HTML document to the user computer 110 through the document provider 601 (step 1008). The HTML document is used to present the verification screen on which the user verifies that the printing is performed under the printing conditions set by the user.

Upon receiving the HTML document for the verification screen, the document browser 401 in the user computer 110 presents the verification screen.

Figure 13:
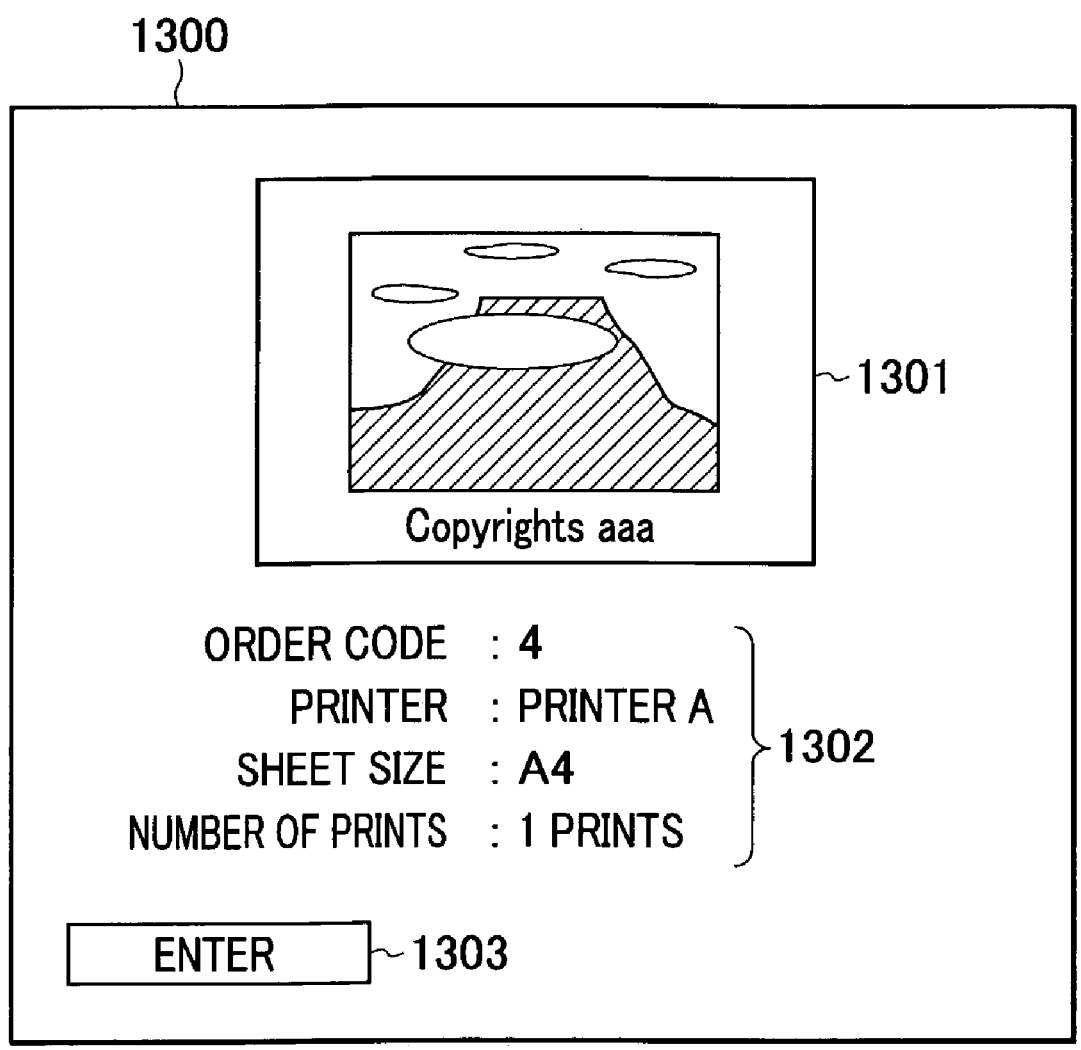
FIG. 13 illustrates a verification screen presented by the document browser in the user computer of FIG. 1.

FIG. 13 illustrates a verification screen 1300 presented by the document browser 401 in the user computer 110 of FIG. 1.

The verification screen 1300 shown in FIG. 13 presents a preview image 1301 which is identical to the preview image 1201 appearing on the printing condition designating screen 1200. The preview image 1301 presents an appropriate preview, which is to be printed out under the conditions written on the order managing table 607 when the order receiver 602 receives the printing conditions.

A printing condition verification section 1302 displays the printing conditions, which are set in the order managing table 607 by the order receiver 602, and the order code, which uniquely identifies the order. Also shown is an enter button 1303.

The user clicks the enter button 1303 to enter the printing order after checking the preview image 1301 and printing condition verification section 1302. The document browser 401 commands the order receiver 602 to enter the order (step 1009).

In response to the order enter command, the document provider 601 in the printing service provider 130 receives the order (step 1010A). The document provider 601 searches the order managing table 607 for a record having the order record received as the parameter, and sets an "image under production" flag to the status 904 of the record found in the search.

The order receiver 602 calls the second parameter, which is stored in the HDD 209 in step 1004, and requests the printing condition designating screen 1200 to present the HTML document of the URL described in the second parameter (step 1010B). If it is difficult to directly request the content provider 120 to do so due to the constraints of the HTTP protocol and HTML document format, the order receiver 602 transmits, to the user computer 110, the HTML document in which a link destination to the second parameter is embedded. The HTML document may have a description to automatically request to transmit a page of the second parameter so that an image stored in the content provider 120 is displayed.

The order receiver 602 initiates the printing data producer 603 and ends the process.

The document provider 501 in the content provider 120 searches the content browsing screen storage 504 for the HTML document that the printing service provider 130 requests the content provider 120 to transmit in step 1010. The document provider 501 transmits the HTML document found in the search to the user computer 110, which includes the order reception end screen (step 1011).

The document browser 401 in the user computer 110 displays the order reception end screen based on the HTML document received from the content provider 120 (step 1012). The order reception end screen shows a statement that the printing order has been received, and a link through which content viewing is continuously performed on the content provider 120.

In the printing service provider 130, the printing data producer 603, which is initiated in step 1010, receives the order code as the parameter at the startup thereof. Using the order code, the printing data producer 603 searches the order managing table 607, and acquires the content address 903 from the record found in the search.

The printing data producer 603 transmits a request to acquire the body of the content pointed to by the content address to the content provider 120 using the communication protocol stored in the usable protocol 804 (step 1013).

Upon receiving the request to acquire the content body from the printing service provider 130, the document provider 501 in the content provider 120 retrieves the requested content body from the content storage 502, and then transmits the content to the printing service provider 130 (step 1014).

The printing data producer 603 in the printing service provider 130 stores, in the printing spool 608, the content data from the record in the order managing table 607 and data required for the printing, such as a variety of settings for printing, and associated information in a state that is identified by the order code (step 1015). The printing data producer 603 then sets a "ready for printing" flag to the status 904 of the record in the order managing table 607, then initiates the printing controller 604, and ends the process.

The printing controller 604 searches for the record having the status 904 with the "ready for printing" flag in the order managing table 607, and acquires an order code string as a result of searching. The printing controller 604 picks out a single order code from the order code string according to a rule, acquires data, which is required to perform the printing corresponding to the code, from the printing spool 608, and then transmits the print data to the printer serving as an output (step 1016). The printing process is thus performed.

Subsequent to the completion of the printing process, the printing controller 604 searches the order managing table 607 using the order code according to which the printing process is performed, and sets a "printed" flag to the status 904 of the record found in the search.

The body of the content in the content provider 120 is thus printed in response to the printing command from the content browsing screen stored in the content provider 120.

Processing of Information Acquisition Request to the Content Provider 120

Selection of the communication protocols and the processing of information acquisition requests to the content provider 120 are discussed with reference to FIG. 14.

The request to acquire the content body in step 1013 of FIG. 10 is first discussed with reference to FIG. 14 to clarify the discussion of the present invention.

Figure 14:
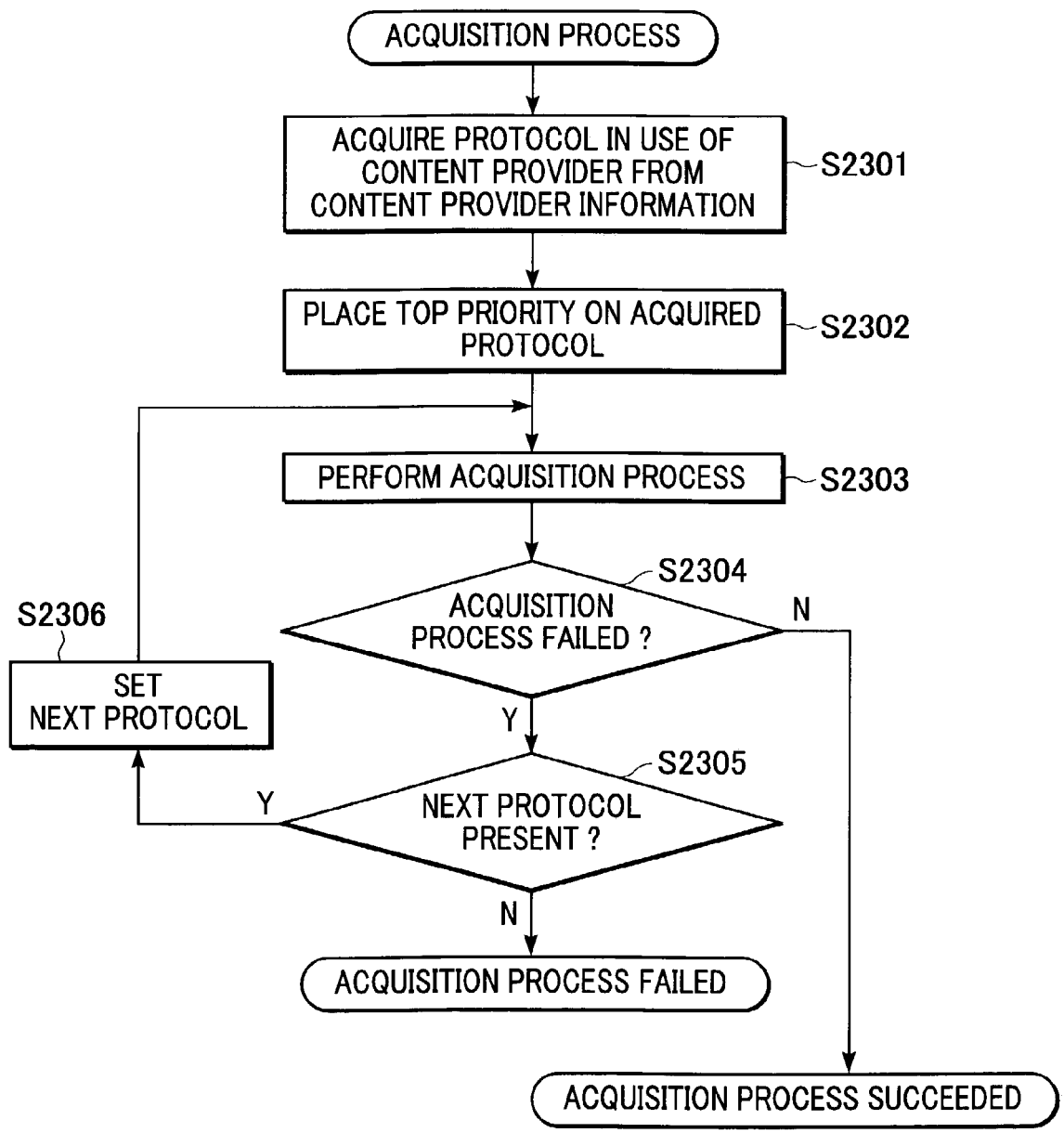
FIG. 14 is a flow diagram illustrating data processing steps carried out by the information processing apparatus according to an embodiment of the present invention.

FIG. 14 is a flow diagram illustrating a data processing procedure carried out by the information processing apparatus of the present invention, corresponding to the process steps of the printing service provider 130 during information acquisition. S2301-S2306 represent steps. It is assumed that the source address of the content body is known at the start of the flow diagram shown in FIG. 14.

In step S2301, the usable protocol 804 in the content provider managing table discussed with reference to FIG. 8 is acquired to acquire the content body. The usable protocol 804 is identified by searching for the record at which the content provider code 902 in the order managing table discussed with reference to FIG. 9 matches the content provider code 801.

The acquired usable protocol 804 is stored in the RAM 202.

In step S2302, a communication protocol having a first priority, out of the communication protocols acquired in step S2301, is set. In the first embodiment, the storage content of the usable protocol 804 in the data string 1811 illustrated in FIG. 8 includes the HTTPs and the HTTP protocols, and the HTTPs protocol is set as having the first priority.

In step S2303, a request to transmit the content body is issued to the content provider 120. In this step, the communication protocol requesting the acquisition may be FTP, and a source address of the content body may be described in accordance with the HTTP protocol. In this case, the source address of the content body must be converted into a format compatible with the FTP, and then the acquisition request is issued.

In step S2304, it is determined whether the acquisition request issued at step S2303 is in error. If it is determined that the acquisition request is in error, the algorithm proceeds to step S2305 to issue the acquisition request in a next communication protocol. If it is determined that the acquisition request is not in error, the acquisition request is successful, and the algorithm ends to proceed to an acquisition process to acquire the requested data.

If it is determined in step S2304 that the request is in error, it is then determined in step S2305 whether a next protocol is present. Since the HTTP protocol is designated subsequent to the HTTPs in the usable protocol 804 in the first embodiment, the algorithm proceeds to step S2506 to issue a next acquisition request. If the acquisition request fails in the HTTP protocol, a next protocol setting is impossible because no next communication protocol is stored in the usable protocol 804. The acquisition request attempt results in an error.

The communication protocol is switched in accordance with the source computer. If an error takes place in the prioritized protocol, the acquisition request attempt is performed using a next prioritized protocol.

Printing Order Process Flow by the Content Provider 121

The user computer 111 presents the browsing screen stored in the content provider 121 and then issues a printing order using the browsing screen. The steps involved in this process will now be discussed.

In the discussion that follows, the printing service provider 130 issues an acquisition request to the data center 140.

Figure 15:
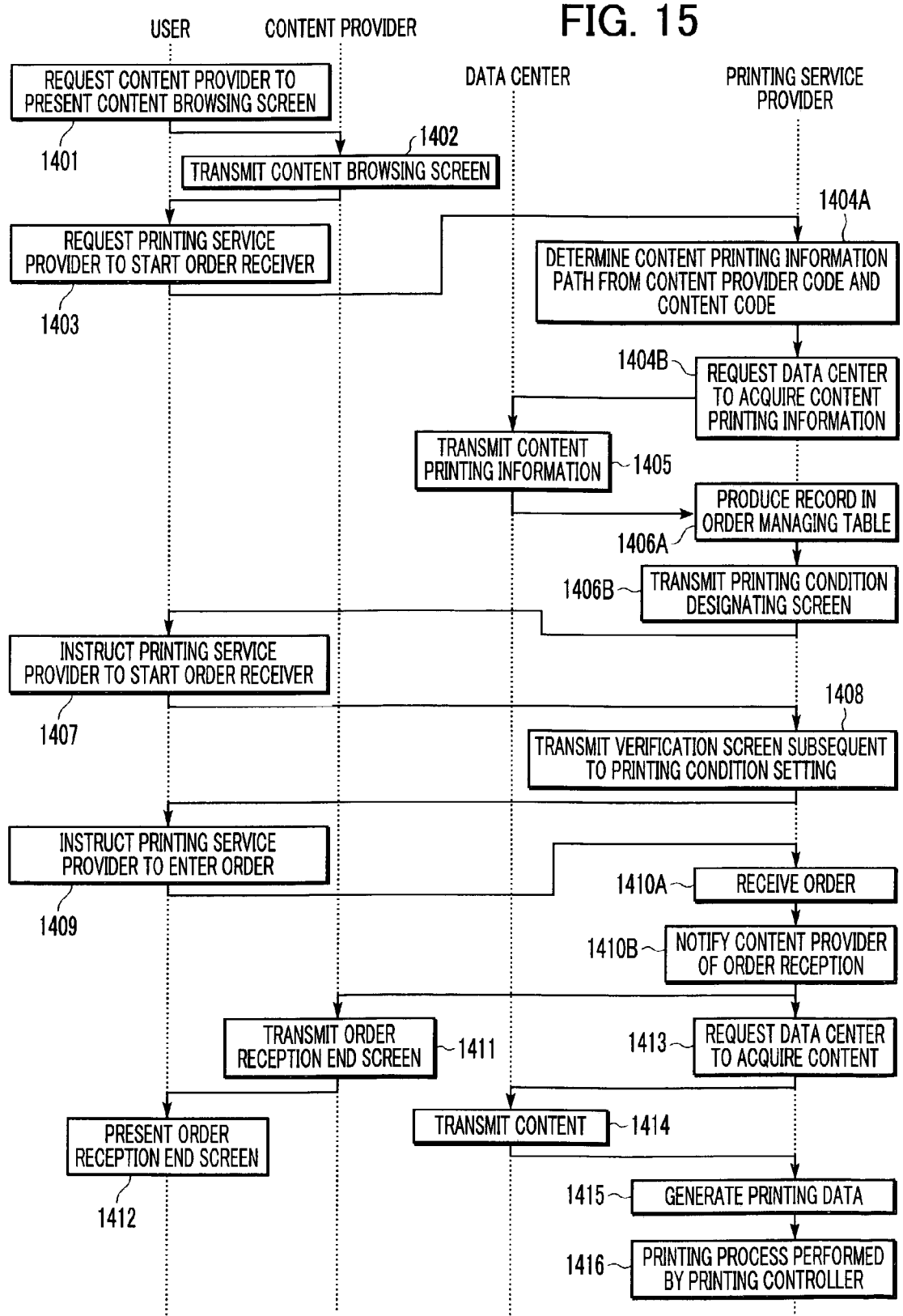
FIG. 15 illustrates a second content printing process sequence in the network system incorporating the information processing apparatus according to an embodiment of the present invention.

FIG. 15 illustrates a second content printing process sequence in the network system incorporating the information processing apparatus of the present invention. The second content printing process sequence corresponds to a process performed by the user computer 111, content provider 121, data center 140, and printing service provider 130. In the discussion that follows, the user uses the user computer 111 to view the content browsing screen in the content provider 121, and places a printing order from the printing service provider 130.

The document browser 401 in the user computer 111 transmits, to the content provider 121, the request to present the content browsing screen. The request to present the content browsing screen designates a URL of the content browsing screen desired by the user according to the HTTP protocol. The user may directly input the URL to the document browser 401 using the KB 208. The URL may also be entered when the user selects a link on the screen presented by the document browser 401 in accordance with the HTML (step 1401).

The request to present the content browsing screen issued by the user computer 111 is transmitted through the network 100 and received by the document provider 501 in the content provider 121 through the NETIF 204. Upon receiving the request, the document provider 501 retrieves an HTML document corresponding to the designated URL from the content browsing screen storage 504. The document provider 501 further retrieves the view data linked to the HTML document from the content browsing screen storage 504. The document provider 501 transmits view data linked to the HTML document to the requesting user computer 111 (step 1402).

The document browser 401 in the user computer 111 receives the HTML document and the view data, thereby presenting the content browsing screen in accordance with the HTML document and the view data as shown in FIG. 11 in a similar manner as in the first embodiment.

The user clicks the print request button with the content browsing screen presented when the user desires the printing of the body of the content of the view image. In response to the clicking of the print request button, the document browser 401 transmits the request to initiate the order receiver to the printing service provider 130 as described in the print request button display and operation command message (step 1403).

Upon receiving the request to initiate the order receiver 602 and the parameters, the document provider 601 in the printing service provider 130 initiates the order receiver 602, and then hands the parameters to the order receiver 602.

The order receiver 602 parses the parameters, thereby identifying the content provider code and the content code from the first parameters, and searches the content provider managing table 605 using the content provider code identified by the parameter. The order receiver 602 generates the content printing information path based on the record found in the search and the content code identified by the parameter (step 1404A). The second content printing process sequence is different from the first content printing process sequence in that the base address 802 in the content provider managing table 605 stores the base address of the data center 140, and in that the source of the content printing information is the data center 140. The second and third parameters are stored in the working area of the HDD 209 as a text file. Using the content printing information path, the order receiver 602 requests the data center 140 to acquire the content printing information (step 1404B). The communication protocol used in the acquisition request is one of the FTP protocol and the HTTP protocol stored in the usable protocol 804 in the content provider managing record 812 of FIG. 8. The first priority protocol is the FTP protocol which is stored first.

The document provider 501 in the content provider 120 receives the request to acquire the content printing information. In response to the request, the document provider 501 searches the content printing information storage 503 for the requested content printing information, and transmits the content printing information found in the search to the printing service provider 130 (step 1405).

The order receiver 602 in the printing service provider 130 acquires the content printing information acquired from the data center 140 and issues a new order code to the content printing information, and generates a new record (step 1406A). The order code 901, the content provider code 902, and the content address 903 acquired from the received content printing information are stored in the new record of the order managing table 607. The "ordering in progress" flag is set to the status 904.

The order receiver 602 acquires the printing information section 702 in the content printing information 700, acquires, from the printing service managing table 606, setting items falling within the limit range described in the printing information section 702, and describes the setting items in an HTML document for presenting a printing condition designating screen.

The order receiver 602 acquires the view data from the view data address stored in the content information column 701 using the communication protocol stored in the usable protocol 804. If the overlay information is present, the combination operation is performed in accordance with the overlay information. Resulting information is then stored in the working area in the HDD 209 as a preview image to be displayed in a printing condition designating screen to be discussed later. The information indicating the storage location is added at a predetermined position in the HTML document for presenting the printing condition designating screen. A filename is attached to the overlay information to permit the overlay information to be searched in the order code in the printing spool 608 or in the order managing table 607.

The HTML document described to present the printing condition designating screen is transmitted to the user computer 111 through the document provider 601 (step 1406B).

The document browser 401 in the user computer 111 displays the printing condition designating screen based on the received HTML document, as shown in FIG. 12 and discussed in connection with the first embodiment.

The user sets the output printer, the sheet size, and the number of prints using the printing condition designating screen indicated by the document browser 401 in the user computer 111. As necessary, the user sets the printing conditions by calling the detail setting screen, entering a detail setting, and then returning to the printing condition designating screen.

After verifying the settings, the user clicks the print order button 1206. In response to the clicking of the print order button 1206, the document browser 401 transmits an initiation command to the order receiver 602 in the printing service provider 130, which is a link destination described in the HTML document. Also transmitted during the transmission of the initiation command are the printing condition designating screen 1200, the printing conditions set in the detail setting screen, and the order code embedded beforehand in the printing condition designating screen 1200 (step 1407).

The document provider 601 in the printing service provider 130 re-initiates the order receiver 602.

The order receiver 602 searches the order managing table 607 for the record having the order code in the parameter, and sets the printing condition in the record found in the search.

The order receiver 602 transmits an HTML document to the user computer 111 through the document provider 601 (step 1408). The HTML document is used to present the verification screen on which the user verifies that the printing is performed under the printing conditions set by the user.

Upon receiving the HTML document for the verification screen, the document browser 401 in the user computer 111 presents the verification screen 1300 as already discussed in connection with the first content printing process sequence.

The user clicks the enter button 1303 to enter the printing order after checking the preview image 1301 and the printing condition verification section 1302. The document browser 401 commands the order receiver 602 to enter the order (step 1409).

In response to the order enter command, the document provider 601 in the printing service provider 130 receives the order (step 1410A). The document provider 601 searches the order managing table 607 for a record having the order record received as the parameter, and sets an "image under production" flag to the status 904 of the record found in the search.

The order receiver 602 calls the second parameter which is stored in the HDD 209 in step 1004B, and requests the printing condition designating screen 1200 to present, on the user computer 111, the HTML document of the URL described in the second parameter (step 1410B).

If it is difficult to directly request the content provider 120 to do so due to the constraints of the HTTP protocol and the HTML document format, the order receiver 602 transmits, to the user computer 111, an HTML document in which a link destination to the second parameter is embedded. The HTML document may have a description to automatically request to transmit a page of the second parameter so that an image stored in the content provider 121 is displayed.

The order receiver 602 initiates the printing data producer 603 and ends the process.

The document provider 501 in the content provider 121 searches the content browsing screen storage 504 for the HTML document which the printing service provider 130 requests the content provider 121 to transmit in step 1410B. The document provider 501 transmits the HTML document found in the search to the user computer 111 (step 1411).

The document browser 401 in the user computer 111 displays the order reception end screen based on the HTML document received from the content provider 121 (step 1412). The order reception end screen shows a statement that the printing order has been received, and a link through which content viewing may be continuously performed on the content provider 121.

In the printing service provider 130, the printing data producer 603 is initiated at step 1410B, receives the order code as the parameter. Using the order code, the printing data producer 603 searches the order managing table 607, and acquires the content address 903 from the record found in the search. The printing data producer 603 transmits a request to acquire the body of the content pointed by the content address to the data center 140 using the communication protocol stored in the usable protocol 804 as in step 1404 (step 1413).

Upon receiving the request to acquire the content body from the printing service provider 130, the document provider 501 in the data center 140 retrieves the requested content body from the content storage 502, and then transmits the content to the printing service provider 130 (step 1414).

The printing data producer 603 in the printing service provider 130 stores, in the printing spool 608, the content data from the record in the order managing table 607 and data required for the printing such as a variety of settings for printing, and associated information in a state that is identified by the order code (step 1415). The printing data producer 603 then sets a "ready for printing" flag to the status 904 of the record in the order managing table 607, then initiates the printing controller 604, and ends the process.

The printing controller 604 searches for the record having the status 904 with the "ready for printing" flag in the order managing table 607, and acquires the order code string as a result of searching. The printing controller 604 picks out a single order code from the order code string according to a rule, acquires data, required to perform the printing corresponding to the code, from the printing spool 608, and then transmits the print data to the printer serving as an output (step 1416). The printing process is thus performed.

Subsequent to the completion of the printing process, the printing controller 604 searches the order managing table 607 using the order code according to which the printing process is performed, and sets a "printed" flag to the status 904 of the record found in the search.

The body of the content in the data center 140 is thus printed in response to the printing command from the content browsing screen stored in the content provider 121.

Second Embodiment

In the first embodiment the printing order issued from one of the user computers 110 and 111 is intended to be addressed to the printing service provider 130. In a second embodiment, the printing order is addressed to one of the content providers 120 and 121 instead of the printing service provider 130.

The system of the second embodiment is discussed with reference to the system configuration shown FIG. 1.

Each of the user computers 110 and 111 has a function to browse a document including image information, such as contents or a catalog of contents stored in the content providers 120 and 121 through the network system 100, and a function to place an order of printing from one of the content providers 120 and 121 in response to the pressing of a printing order button contained in the document.

Each of the content providers 120 and 121 has a function to provide one of the user computers 110 and 111 with a document including image information, such as contents or a catalog of contents (hereinafter also referred to as a content browsing screen) through the network system 100. In response to a request from one of the user computers 110 and 111, each of the content providers 120 and 121 feeds a document for forming a printing order screen, receives print settings on the screen, organizes the printing order, and then places the printing order from the printing service provider 130 in accordance with the printing order.

Each of the content providers 120 and 121 also has a function to supply the printing service provider 130 with a content (also referred to as a commodity or body of a content) and associated information, and a function to acquire, from the printing service provider 130, information about a printing service that organizes the printing order screen.

In the second embodiment, the number of content providers connected to the network is two. The number of content providers is at least one, and there is no upper limit set on the number of content providers in the present invention. In the second embodiment, for the convenience of explanation, one operator operates one content provider. Optionally, one operator may operate two or more content providers to distribute an access load among them or to handle a plurality of types of contents in the present invention.

The printing service provider 130 is an information processing apparatus that performs a printing process mainly in response to a request from one of the content providers 120 and 121.

The printing service provider 130 receives the printing order in response to the request from one of the content providers 120 and 121, acquires a content from one of the content providers 120 and 121 and the data center 140, to be discussed later, in accordance with the printing order, and performs a printing process. The printing service provider 130 has further a function to supply one of the content providers 120 and 121 with information relating to the printing service.

In the second embodiment, for the convenience of explanation, one operator operates one printing service provider. Optionally, one operator may operate two or more printing service providers to distribute an access load among them in the present invention.

In the second embodiment, the body of a content to be printed is present in the content provider 120.

The content provider 121 has a catalog screen of contents, while information required for the printing order, such as the body of the contents and the content printing information, which is information associated with the content, are stored in the data center 140.

Since the user computers 110 and 111, the content providers 120 and 121, and the data center 140 used in the second embodiment remain unchanged in internal construction from those in the first embodiment as shown in FIG. 2, the discussion thereof is omitted here.

Printing Service Provider

Since the printing service provider 130 is not different in construction from that in the first embodiment, the discussion thereof is omitted here.

Construction of the User Computer

The software construction of the user computer 110 remains unchanged from that in the first embodiment shown in FIG. 4 and the discussion thereof is omitted here.

Construction of the Content Provider and Data Center

Figure 16:
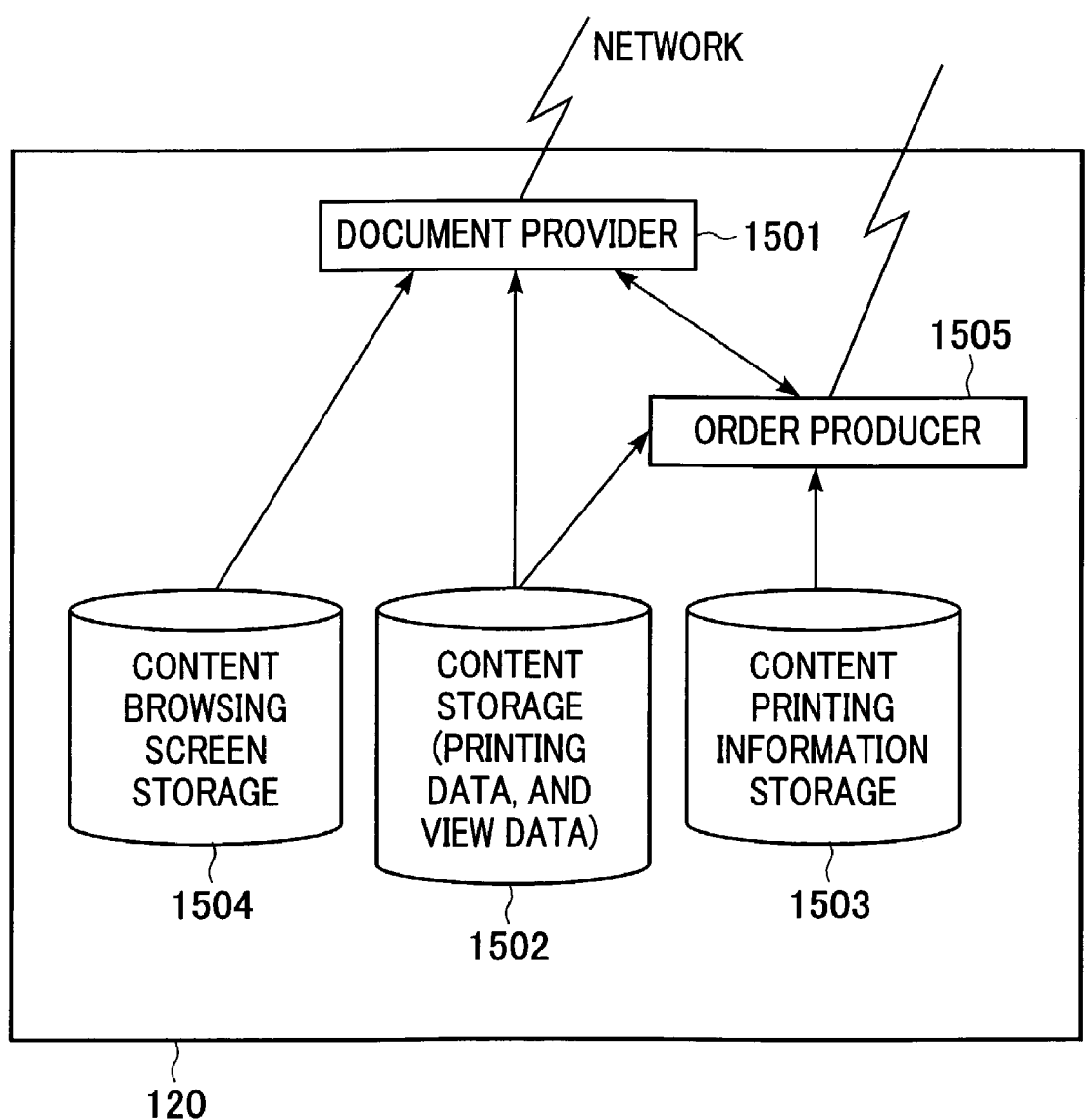
FIG. 16 illustrates processing units in a content provider in accordance with an embodiment of the present invention.

FIG. 16 illustrates processing units in the content provider 120 in accordance with the second embodiment of the present invention. Each of the content provider 121 and data center 140 is substantially identical in construction to the content provider 120. The construction of each of these units is discussed with reference to FIG. 16. The document provider 1501 is an application program that responds to a request from an external computer such as one of the user computers 110 and 111, and the printing service provider 130 through a network, such as the Internet, and searches data stored in the HDD 209 (to be discussed later) for an HTML document, text data, or image data requested by the external computer.

The document provider 1501 is generally called an Internet server program or a WWW server program. In addition to transmitting a document, the document provider 1501 develops another application program stored in the HDD 209 or the like onto the RAM 202 to use that application program in response to a request from the external computer. As necessary, the document provider 1501 authenticates a user ID of the user in response to a request from the outside, thereby limiting data to be transmitted.

A content storage 1502 stores an image to be printed on the printing service provider 130, the body of a content such as a document, and view data and printing data which are intended to be viewed by the user on the user computer. For example, as for an image, the data to be browsed is image data that has a definition (resolution) reduced down to a level at which the user still recognizes the image on the screen. As for a document, the data to be browsed is image data that has a definition (resolution) reduced down to a level at which the user still recognizes a summary of document text and a first page thereof. In the present invention, there is no particular requirement on the data to be browsed.

The data of the content storage 1502 is stored in the HDD 209. The document provider 1501 searches the content storage 1502 in response to a request from one of the user computers 110 and 111 and the printing service provider 130, and transmits data replying to the request to the requesting unit.

A content printing information storage 1503 stores content printing information. The content printing information contains a variety of limitations relating to a content, such as a printing size and the number of prints, a variety of limitations relating to printing conditions, such as a sheet size and print quality, and information required for printing order and printing process.

The data of the content printing information storage 1503 is stored in the HDD 209. The order producer 1505 searches and references the content printing information storage 1503.

A content browsing screen storage 1504 stores a screen through which the user computers 110 and 111 browse the data of a content stored in the content storage 1502, and an HTML document expressing a screen (the content browsing screen) on which a printing request is entered.

The data of the content browsing screen storage 1504 is stored in the HDD 209. The document provider 1501 searches the content browsing screen storage 1504 for data in response to a request from the external computer such as the user computers 110 and 111 and transmits the data replying to the request to the external computer.

An order producer 1505 includes a group of application programs and receives printing orders of contents issued from the content providers 120 and 121 in response the user computers 110 and 111.

The order producer 1505 operates in three major functional phases. In a first phase, the order producer 1505, initiated in response to a printing order issued by one of the user computers 110 and 111, identifies a requested content, acquires the content printing information required for the reception of the order of the identified content from one of the content printing information storage 1503 and the data center 140, and further acquires required information from the printing service provider 130. Furthermore, the order producer 1505 generates an HTML document for displaying a printing condition designating screen for setting a variety of settings during printing. The generated HTML document is then transmitted to one of the user computers 110 and 111, which has issued the request.

In a second phase, the order producer 1505 is initiated in response to a printing condition setting request, which is issued by one of the user computers 110 and 111, i.e., the destination of the HTML document. The printing condition setting request is issued together with a variety of printing conditions set in the printing condition designating screen by the one of the user computers 110 and 111. The order producer 1505 generates a printing order, and transmits an HTML document for displaying a printing verification screen to the user computers 110 and 111.

In a third phase, the order producer 1505 receives a printing order end notice issued by the user computers 110 and 111 in a verification process in the printing verification screen, and generates the printing order information. The order producer 1505 places a printing order from the printing service provider 130.

In a fourth phase, the order producer 1505, initiated by the printing service provider 130, transmits a reception notice of the printing order request placed in the third phase, information such as the order code transmitted by the printing service provider 130 to notify of the user, and an HTML document for displaying an order reception end screen.

The order producer 1505 discussed above is generally called a CGI program. In response to a request from an external computer, the document provider 501 develops the CGI program from within the HDD 209 on the RAM 202 to use the CGI program. The construction of the content provider 120 has been discussed.

Since the content provider 121 is treated as having the content printing information and the content body stored in the data center 140 in the second embodiment, the content printing information storage 1503 and the content storage 1502 are not required elements.

The content provider 121 stores data (content printing information location data), which has a description of the content printing information stored in the content printing information storage 1503 in the data center 140. The content printing information location data may be stored in any storage, such as the content browsing screen storage 1504 in the content provider 121.

In the second and fourth content printing processing sequences, the content provider 121 is treated as having the content printing information storage 1503, in which the content printing information location data is stored.

In the second embodiment, content view data may be stored in the content browsing screen storage 1504 in the content provider 121.

In the data center 140, the document provider 1501 is not necessarily a so-called WWW server. The data center 140 may use any server as long as the server transmits a file to the printing service provider 130 and handles a communication protocol described in content provider information, which is to be discussed with reference to FIG. 18. For example, the document provider 1501 may be a File Transfer Protocol (FTP) server. In the present invention, it is not a requirement that the data center 140 include the content browsing screen storage 1504.

The document provider 1501 and the content storage 1505 are formed of application programs, and are read from one of the ROM 203, the HDD 209, and the FDD 210 and developed onto the RAM 202 before use. The content storage 1502, the content printing information storage 1503, and the content browsing screen storage 1504 are stored in the HDD 209.

Construction of the Printing Service Provider

Figure 17:
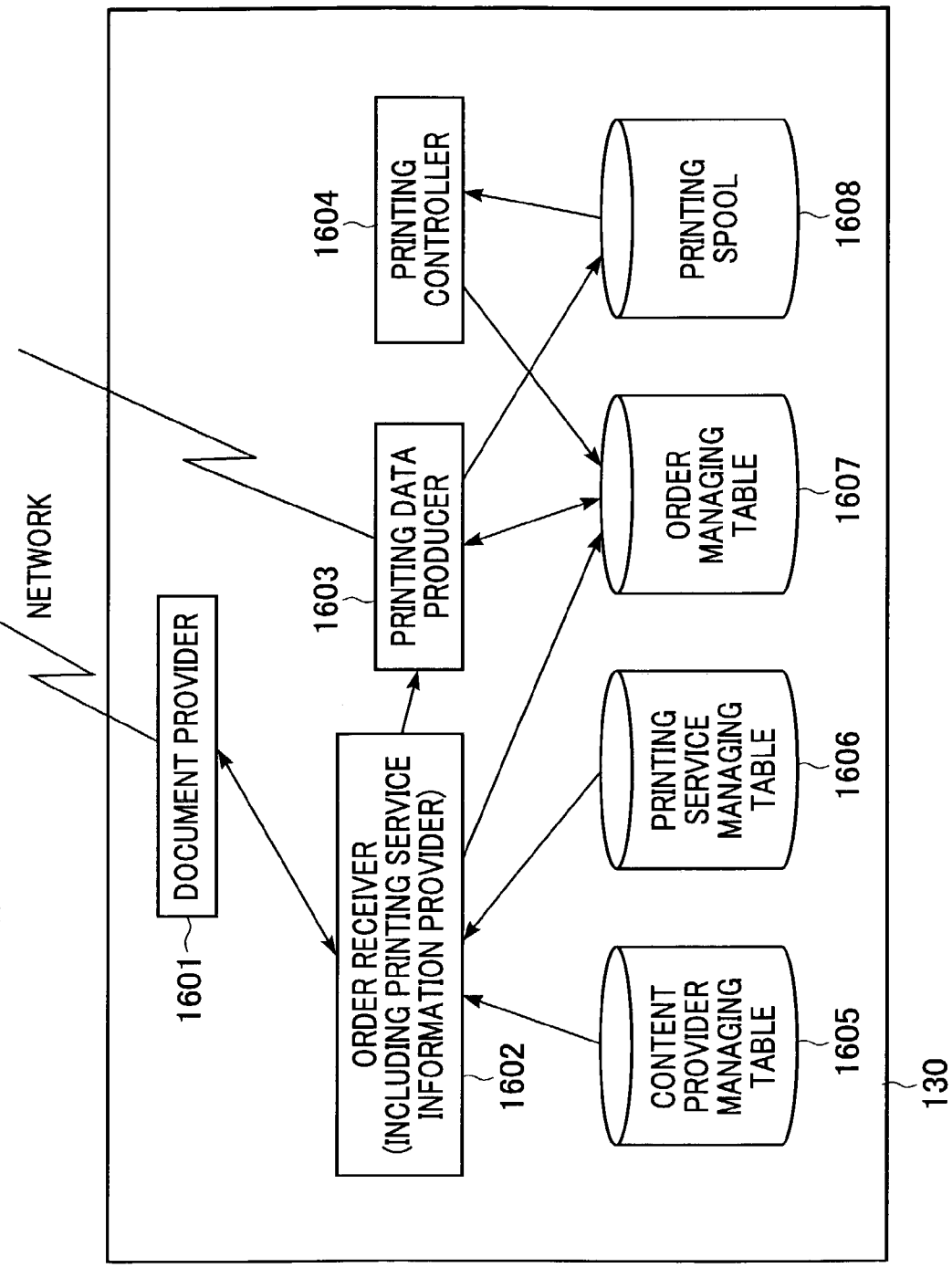
FIG. 17 illustrates processing units in the printing service provider of FIG. 1.

FIG. 17 shows processing units in the printing service provider 130 of FIG. 1.

As shown, a document provider 1601 is equivalent to the document provider 1501. The document provider 1601 is an application program. The document provider 1601 responds to a request from an external computer, such as one of the content providers 120 and 121, through a network such as the Internet, searches data stored in the HDD 209 (to be discussed later) for an HTML document, text data, or image data requested by the external computer, and then transmits the data found in the search to the requesting external computer.

The document provider 1601 is generally called an Internet server program or a WWW server program. In addition to transmitting a document, the document provider 1601 develops another application program stored in the HDD 209 or the like onto the RAM 202 to use that application program in response to a request from an external computer, and then transmits a processing result. As necessary, the document provider 1601 authenticates a user ID of the user in response to a request from the outside, thereby limiting data to be transmitted.

An order receiver 1602 includes a group of application programs receiving printing orders of contents, and is initiated in response to a printing order request from one of the content providers 120 and 121. The order receiver 1602 has two major phases in the function thereof.

In a first phase, the order receiver 1602 transmits printing service information stored in a printing service managing table 1606 (to be discussed later) in response to a printing service information acquisition request issued from one of the content providers 120 and 121.

In a second phase, the order receiver 1602, initiated in response to a printing order request issued from one of the content providers 120 and 121, generates a printing order based on the printing service information transmitted together with the printing order request, generates order information in an order managing table 1607 (to be discussed later), and initiates a printing data producer 1603 for performing a printing preparation job.

The order receiver 1602 discussed above is generally called a CGI program. In response to a request from an external computer, the document provider 1601 develops the CGI program from within the HDD 209 onto the RAM 202 before use.

The printing data producer 1603 is an application program, which is read from within the HDD 209 and developed onto the RAM 202 by the order receiver 1602. Upon being initiated by the order receiver 1602, the printing data producer 1603 extracts a record to be produced as printing data, from the order managing table 1607, and acquires the body of the content to be printed, in accordance with the record, from one of the content provider 120 and the data center 140. The printing data producer 1603 produces other data required for printing and stores the other data in a printing spool 1608.

A printing controller 1604 controls a printing process of the printing data in the printing spool 1608 in accordance with the order managing table 1607. The printing controller 1604 is an application program, which is developed from within the HDD 209 onto the RAM 202. The printing controller 1604 is initiated by the printing data producer 1603. Furthermore, the printing controller 1604 may be initiated at any timing by the user of the printing service provider 130 or may be automatically initiated at regular intervals.

A content provider managing table 1605, having a data structure to be discussed later with reference to FIG. 19, stores a content provider code identifying the content provider, and addresses of the content provider and the data center.

The printing service managing table 1606 stores all settings of a printing service provided by the printing service provider 130. The settings include the type of a printer, printing conditions (layout information such as a sheet size, number of prints, sheet quality, definition (resolution), position, scale, both side printing, alignment direction of stitching, and binding information subsequent to printing, such as binding and lamination, and framing) and pricing information for printing.

A printer registered in the printing service managing table 1606 performs a printing process of the printing order received by the printing service provider 130. The printer may be one of the printer connected to the PRTC 301 of the printing service provider 130, a printer directly connected to the network 100, or a printer connected to a computer other than the printing service provider 130 connected to the network 100.

The order managing table 1607, having the data structure discussed in connection with the first embodiment with reference to FIG. 9, stores the printing order, information associated with the printing order, and the status of progress of the printing.

The printing spool 1608 stores the body of the content that answers the printing order and data required to carry out the printing.

All units 1601-1604 are application programs, and are read from one of the ROM 203, the HDD 209, and the FDD 210, and are developed onto the RAM 202 before use. All units 1605-1608 are data stored in the HDD 209.

Content Printing Information

The content printing information stored in the content printing information storage 1503 in each of the content provider 120 and data center 140 is discussed below.

As already discussed, the content printing information is information required for the printing order and printing process when the content of the content provider is printed.

In accordance with the present invention, the content printing information is not limited to any particular data format or description format. A printable content stored in the content storage 1502 must have corresponding content printing information. The method of transferring the content printing information to the content provider is not limited to any particular one.

To clarify the present invention, it is assumed that a text file describing the content printing information corresponding to a printable content is stored in the content printing information storage 1503 in the second embodiment.

If the body of the content is present in the data center 140, the content printing information must also be present in the data center 140. The content printing information storage 1503 in the content provider 121 holds the text file corresponding to the content. The text file contains a description of the location of the content printing information storage 1503 in the data center 140, thereby indicating the location of the body of the content printing information.

The object of the present invention is achieved even if the body of the content printing information is held in the content provider 121 with the body of the content present in the data center 140.

Described in the content printing information relating to the content, as already discussed in connection with the first embodiment, are (1) a content code that uniquely identifies the content at least within the content provider, (2) a content type such as a document or an image, (3) a location where a content body is present, (4) a location where data to be browsed is present, (5) pricing information, (6) overlay information, including an indication of copyright and serial number, which must be overlaid when the content is printed, and (7) overlay position information indicating an overlay position of the overlay information.

The content printing information to limit the printing of the content includes, as required, (1) size limiting information for limiting the minimum and maximum sizes of the content during printing, (2) sheet size limiting information for limiting a printing sheet size, (3) sheet quality limiting information for limiting the quality of a paper sheet, (4) number-of-prints limiting information for limiting the maximum number of prints, and (5) printer limiting information for limiting the type of a printer that performs a printing process.

As necessary, the content printing information further contains, as necessary, (1) default settings for printing, (2) payment information for the content, (3) payment information for prints, (4) identification information of a user, and (5) identification information of the printing order managed by the content provider.

In accordance with the second embodiment, the content printing information stored in the content printing information storage 1503 in each of the content provider 120 and the data center 140 is similar to the one shown in FIG. 7, and the detailed discussion thereof is omitted here.

In the second embodiment, information that may be omitted is omitted in not only the printing information section 702 but also the content information section 701 and miscellaneous information section 703, as long as such omission causes no inconvenience in the printing order and printing process.

Content Printing Information Location Data

FIG. 18 illustrates the data structure of the content printing information location data stored in the content provider 120 shown in FIG. 1.

As shown, a content printing information location data 1700 in the content provider 121 is supplied in a text data file in the second embodiment. The content printing information location data 1700 starts with an index enclosed in brackets "[ ]", followed by setting information in the form of "setting item=set value".

A first index "[DATACENTER]" means that the body of the content and the content printing information are not present in the computer, but present in an external computer such as the data center 140. Referring to FIG. 18, there are two settings. A line "CONTENTSCODE=DEF0001" means that the content indicated by the content printing information location data 1700 is identified by a content code "DEF0001".

A line "ADDRESS=http://www.hanbai_Stock/printinfo/DEF0001.inf" represents the location of the body of the content printing information, and is described using a URL in the second embodiment.

When the content provider 121 receives a printing order of a content expressed by a content code "DEF0001", the content printing information location data described with reference to FIG. 17 is referenced in the content printing information storage 1503. The body of the content printing information is acquired from the data center 140 in accordance with the location in the content printing information.

Content Provider Managing Table

The content provider managing table 1605 of the printing service provider 130 is discussed below.

The content provider managing table 1605 stores and manages a content provider code that uniquely identifies a content provider, and locations of the content providers 120 and 121. The content provider managing table 1605 is stored in the HDD 209 in the second embodiment. The content provider managing table 1605 may also be configured using a database system.

When the order receiver 1602 performs an order reception process, the content provider managing table 1605 is searched. By referencing the search result, the order receiver 1602 performs a reception process of a printing order of a content present in the external computer.

FIG. 19 illustrates in detail a structure of a content provider managing table 1605 of FIG. 17.

As shown, the content provider managing table 1605 in the second embodiment manages two items 1801 and 1802 in a single record (hereinafter referred to as a content provider managing record).

A content provider code 1801 is issued beforehand and stored for each content provider to identify the content provider.

A base address 1802 represents the locations of the content provider 120 and the data center 140 over the network. In the second embodiment, the locations are described using a URL.

A usable protocol 1803 stores communication protocols, which are used to acquire the content printing information and content data from the content provider 120 and the data center 140. The usable protocol 1803 stores A plurality of communication protocols by separating the protocols by delimiters. The delimiters in the second embodiment are the comma "," character.

If a plurality of communication protocols are listed, a preceding protocol has priority.

The communication protocols listed in the usable protocol 1803 are compatible with the content provider 120, the data center 140, and the printing service provider 130.

The communication protocols listed in the usable protocol item are compatible with the content provider 120, data center 140, and printing service provider 130.

The usable protocol 1803 of a content provider information 1812 corresponding to the content provider 121 is used to acquire the body of the content from the data center 140 in the second embodiment. The usable protocol for the data center 140 is stored.

A parameter provided at the start of the order receiver 1602 identifies the content provider code 1801, and a source URL is acquired. The source URL is compared with the base address 1802 to identify whether the order is from the content provider 120 or the content provider 121. Using the communication protocol stored in the usable protocol 1803, an acquisition request is placed.

Order Managing Table

Since the order managing table 1607 remains unchanged in construction from the one in the first embodiment discussed with reference to FIG. 9, the discussion thereof is omitted here.

In the second embodiment, a record is formed of the printing order information, which is transmitted together with the printing order request issued from one of the content providers 120 and 121.

Printing Order Information

The printing order information is generated by the order producer 1505 in one of the content providers 120 and 121, and is then transmitted to the printing service provider 130.

The received printing order is parsed by the order receiver 1602 in the printing service provider 130. Based on the result of the parsing, a new record is formed in the order managing table 1607. A printing order is thus constructed, and the printing data producer 1603 produces printing data from the generated record.

FIG. 20 illustrates a structure of the printing order information 1900 in the information processing apparatus of the present invention.

As shown, the printing order information 1900 is supplied in a text data file. The printing order information 1900 starts with an index enclosed in brackets "[ ]", followed by settings in the format of "setting item=set value".

A content information section 1901 describes information relating to the content. Two indexes to indicate the content information section 1901 are present in the second embodiment. A first index [CONTENTS] describes a content code, and a second index [OVERLAY] describes a string and a position of overlay characters, which are to be printed in overlay together with the content during printing.

Referring to FIG. 19, four settings are present under the first index.

The content information section 1901 may have items similar to those in the content information column 701 in the content printing information. The order producer 1505 in the content provider 120 produces the content information section 1901 from the content printing information.

The setting "CONTENTSCODE=ABC0001" means that the content of the content printing information 1900 is identified by a content code "ABC0001".

The setting "TYPE=IMAGE" relates to the type of the content, and means here that the "ABC0001" is an image.

The setting "ADDRESS=http://www.sellpc/PRINTDATA/abc0001.jpg" means that the location of a file "abc0001.jpg", which is the body of the content, is at http://www.sellpc/PRINTDATA/abc0001.jpg"

The second embodiment uses the HTTP protocol.

The last setting "PRICE=30" in the index [CONTENTS] means that the price of the content is $30. In the second embodiment, the unit of currency is omitted. Optionally, the unit of currency may be displayed if a plurality of units of currency are available in the second embodiment.

The other index "[OVERLAY]" of the content information section 1901 describes additional data, which is printed together with the content when the content is printed, and the location of the additional data.

The setting STRING="COPYRIGHT" means the additional data. A string of characters enclosed in double-quote characters are printed together with the content.

The settings HORIZONTAL=CENTER and VERTICAL=UNDERBOTTOM define the location where the additional data is provided. As shown in FIG. 20, the additional data is located at a horizontally central and vertically bottom position.

A print setting information section 1902 describes the printing conditions set based on the printing service information transmitted from the printing service provider 130 to the content provider 120.

The print setting information section 1902 in the second embodiment is represented by an index "[PRINT PARAMETER]".

As shown in FIG. 20, three setting items are presented under the index "[PRINT PARAMETER]". In the print setting information section 1902, setting items other than the three settings items shown in FIG. 20 may be available. For example, print quality is available. Information omitted here in the setting in the second embodiment has no limitation thereon or has default values set beforehand by the printing service provider 130.

The setting "PRINTER=A" means that the printer is "A".

The setting "PAPERSIZE=A4" means that the sheet size to be printed on is A4.

The setting "PRINTVOLUME=1" means that the number of prints is 1.

A miscellaneous information section 1903 lists miscellaneous information of the content printing information, not covered by the information relating to the content and the limiting information of the printing of the content. The miscellaneous information section 1903 is represented by an index "[ETC]" in the second embodiment.

Referring to FIG. 20, the setting "PAYMENT=FINISHED" means that the bill for the use of the content has already been paid.

The content printing information in the second embodiment has been discussed with reference to FIG. 20. Information that may be omitted is omitted in not only the print setting information section 1902 but also the content information section 1901 and miscellaneous information section 1903, as long as such omission causes no inconvenience in the printing order and printing process.

Process Flow of the System

The process flow of the second embodiment of the present invention will now be discussed with reference to FIG. 21.

FIG. 21 illustrates a third content printing process sequence in the network system incorporating the information processing apparatus of the present invention. The third content printing process sequence is carried out by the user computer 110, the content provider 120, and the printing service provider 130 of FIG. 1.

It is assumed in the following discussion that the user views the content browsing screen on the content provider 120 using the user computer 110, and places a printing order from the content provider 120, and that the content provider 120 in turn transfers the printing order to the printing service provider 130.

The user transmits a request to present a content browsing screen to the content provider 120 using the document browser 401 in the user computer 110. The request designates a URL of the content browsing screen desired by the user in accordance with the HTTP protocol. The user may directly input the URL to the document browser 401 using the KB 208. The URL may also be entered when the user selects a link on the screen presented by the document browser 401 in accordance with the HTML (step 2001).

The request to present the content browsing screen issued by the user computer 110 is transmitted through the network 100 and received by the document provider 1501 in the content provider 120 through the NETIF 204. Upon receiving the request, the document provider 1501 retrieves an HTML document corresponding to the designated URL from the content browsing screen storage 1504. The document provider 1501 further retrieves the view data linked to the HTML document from the content storage 1502. The HTML document and the view data are then transmitted to the user computer 110 (step 2002).

The document browser 401 in the user computer 110 receives the HTML document and the view data, thereby presenting the content browsing screen in accordance with the HTML document and the view data. The content browsing screen is discussed below with reference to FIGS. 22A and 22B.

Figures 22A, 22B:
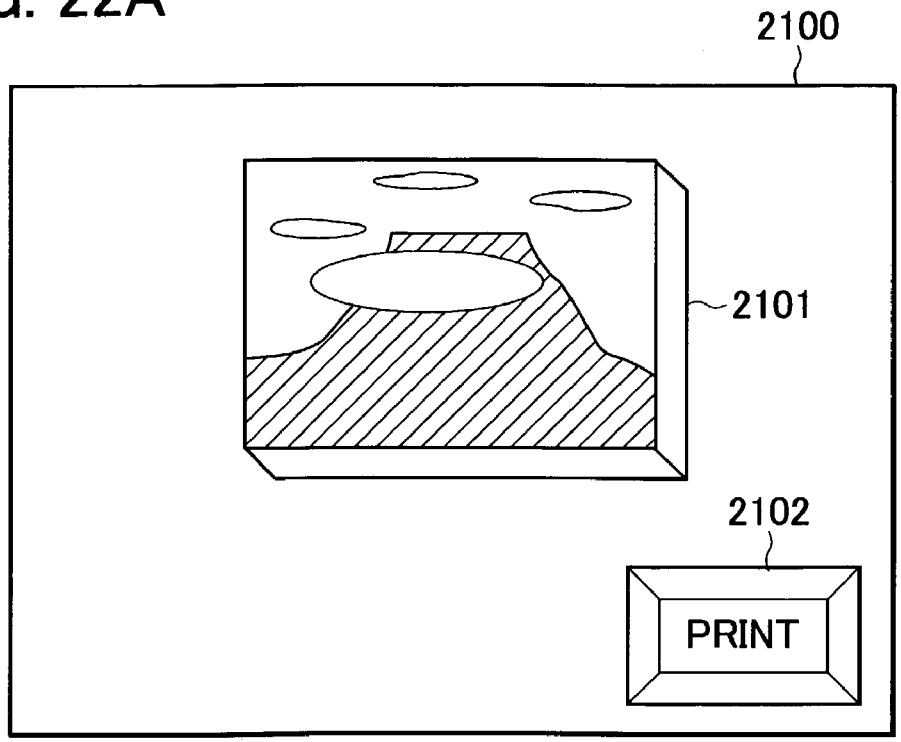
FIG. 22A illustrates a content browsing screen presented on the user computer of FIG. 1.
FIG. 22B illustrates an HTML document transmitted by the content provider to display the browsing screen.

FIG. 22A illustrates a content browsing screen 2100 presented on the user computer 110 of FIG. 1 and FIG. 11B illustrates an HTML document transmitted by the content provider 120 to display the browsing screen.

As shown, the content browsing screen 2100 is presented on the user computer 110 in the second embodiment.

An preview image 2101 is displayed in accordance with the view data.

A print request button 2102 appearing on the screen is used to request the printing service provider 130 to print a content.

An HTML document 2110 describes the layout and the link of the content browsing screen 2100. A view presentation designating message 2111 has a description to present the browsing screen. In the second embodiment, the view presentation designating message 2111 describes the location of the view data and image filename.

A print request button display and operation command message 2112 describes the displaying of the print request button and an operation command to the document browser 401 when an operation command is issued by clicking the print request button, for example.

A description of http://www.sellpc/pps/pps.exe in the print request button display and operation command message 2112 is an initiation command portion to initiate the CGI program, i.e., the order producer 1505 in the content provider 120. A portion "NO=0001ABC0001" is a first parameter at the startup of the order producer 1505.

A plurality of parameters are designated using "&". In the second embodiment, the first parameter only is used. The first parameter is constructed of a content code stored in the content printing information 1900.

Referring to FIG. 22A, the user clicks the print request button 2102 using the KB 208 with the content browsing screen 2100 presented when the user desires the printing of the body of the content of the preview image 2101. In response to the clicking of the print request button 2102, the document browser 401 transmits the request to initiate the order producer 1505 to the content provider 120 as described in the print request button display and operation command message 2112 (step 2003).

Upon receiving the request to initiate the order producer 1505 and the parameters, the document provider 1501 in the content provider 120 initiates the order producer 1505 and then hands the parameters to the order producer 1505.

The order producer 1505 stores the parameters in a working area of the HDD 209, and then issues a printing service information transmission request to the printing service provider 130 to request the printing service provider 130 to transmit printing service information (step 2004).

Upon receiving the printing service information transmission request, the document provider 1601 in the printing service provider 130 initiates the order receiver 1602. The order receiver 1602 transmits the printing service information in the printing service managing table 1606 to the content provider 120 (step 2005).

The order producer 1505, which has received the printing service information, stores the printing service information in one of the RAM 202 and the HDD 209. The order producer 1505 identifies the content code from the first parameter stored in the HDD 209 in step 2004, and searches the content printing information storage 1503 in accordance with the identified content code, acquires the content printing information found in the search, and stores the content printing information in the working area of the HDD 209 (step 2006A).

The order producer 1505 acquires the print setting information section 1902 in the printing order information 1900, acquires, from the printing service information stored in one of the RAM 202 and the HDD 209, setting items falling within the range described in the print setting information section 1902, and describes the setting items in an HTML document for presenting a printing condition designating screen.

The order producer 1505 acquires the view data from the view data address stored in the content information section 1901. If the overlay information is present, a combination operation is performed in accordance with the overlay information. Resulting information is then stored in the working area in the HDD 209 as a preview image to be displayed in a printing condition designating screen (to be discussed later). The information indicating the storage location is added at a predetermined position in the HTML document for presenting the printing condition designating screen. A HTML document describing the printing condition designating screen is transmitted from the document provider 1501 to the user computer 110 (step 2006B).

The document browser 401 in the user computer 110 displays the printing condition designating screen based on the received HTML document, which has been already discussed in connection with the first embodiment with reference to FIG. 12.

The user sets the output printer, sheet size, and number of prints using the printing condition designating screen indicated by the document browser 401 in the user computer 110. As necessary, the user sets the printing conditions by calling the detail setting screen by clicking the print order button, entering a detail setting, and then returning to the printing condition designating screen.

After verifying the settings, the user clicks the print order button. In response to the clicking of the print order button, the document browser 401 transmits an initiation command to the order producer 1505 in the content provider 120, which is a link destination described in the HTML document. Also transmitted during the transmission of the initiation command are the printing conditions as the parameter (step 2007).

The document provider 1501 in the content provider 120 re-initiates the order producer 1505.

The order producer 1505 stores the printing conditions as the parameter in the working area in the HDD 209, and then transmits, to the user computer 110 through the document provider 1501, a verification screen HTML document for presenting a verification screen on which the user verifies that the printing is performed under the printing conditions set by the user (step 2008).

Upon receiving the HTML document for the verification screen, the document browser 401 in the user computer 110 presents the verification screen, which has been discussed in connection with the first embodiment with reference to FIG. 13.

The user clicks the enter button to enter the printing order after checking the preview image and the printing conditions. The document browser 401 commands the order producer 1505 to enter the order (step 2009).

In response to the order enter command, the document provider 1501 in the content provider 120 generates the printing order information, discussed with reference to FIG. 20, based on the content information section 1901 in the printing order information 1900 stored in the HDD 209 in step 2006 and the printing conditions stored in step 2008.

The document provider 1501 issues an initiation command to the order receiver 1602 in the content provider 120 to place a printing order. During the initiation command, a content provider code, the generated printing order information, and a URL as a return location are transmitted as the parameters. The return location in the second embodiment is determined in the initiation command by a CGI application (step 2010).

In response to the initiation command, the document provider 1601 in the printing service provider 130 initiates the order receiver 1602 (step 2011).

The order receiver 1602 searches the content provider managing table 1605 for a record having the content provider code handed over as the parameter, and acquires the base address 1802 of the record found in the search. The order receiver 1602 queries the document provider 1601 about a sender of the initiation command, thereby checking that the sender of the initiation command is the content provider 120.

The order receiver 1602 issues a new order code, and generates a new record as described in the order managing record 914. The order code 901, content provider code 902 received by the parameter, and content address 903 acquired from the received printing order information are stored in the new record of the order managing table 1607. The status 904 is set to the "ordering in progress".

If the overlay information is present in the printing order information, a filename is attached thereto before storage so that a searching operation is performed in the order code in the printing spool 1608 or in the order managing table 1607.

The order receiver 1602 commands the order producer 1505 to initiate in the content provider 120, which is the return URL handed over as the parameter. As the initiation command, the order code is transmitted as the parameter.

After setting an "image under production" to the status 904 in the order managing record, the order receiver 1602 initiates the printing data producer 1603 and ends the process.

In response to the initiation command of the order producer 1505 transmitted by the printing service provider 130 in step 2011, the document provider 1501 in the content provider 120 initiates the order producer 1505. The order producer 1505 generates an HTML document containing the order code handed over by the parameter, and transmits the HTML document to the user computer 110 (step 2012).

The document browser 401 in the user computer 110 displays the order reception end screen based on the HTML document received from the content provider 120. The order reception end screen presents a display for the order code describing that the printing order has been received, and a link through which content viewing on the content provider 120 is continued (step 2013).

The printing data producer 1603, which is initiated in step 2011 in the printing service provider 130, receives the order code as the parameter at the startup thereof. The printing data producer 1603 searches the order managing table 1607 according to the order code, and acquires the content address 903 from the record found in the search.

The printing data producer 1603 transmits a request to acquire the body of the content pointed by the content address to the content provider 120 using the communication protocol stored in the usable protocol 1803. The HTTPs or the HTTP protocol stored in the usable protocol 1803 in the content provider information example 1811 are used here.

The HTTPs protocol is used with priority in the second embodiment. Since the acquisition request process has already been discussed in connection with the first embodiment with reference to FIG. 23, the detailed discussion thereof is omitted here. As in the first embodiment, the address stored in the content address 903 is converted to a description corresponding to the communication protocol in use in this process (step 2014).

In response to the acquisition request of the content body from the printing service provider 130, the document provider 1501 in the content provider 120 acquires the requested content in the content storage 1502, and transmits the content to the printing service provider 130 (step 2015).

Upon receiving the content, the printing data producer 1603 in the printing service provider 130 stores, into the printing spool 1608, the content data from the record in the order managing table 1607 and data required for printing such as a variety of settings and associated information in a state that allows these pieces of data to be identified with an order code. The printing data producer 1603 then sets a "ready for printing" flag to the status 904 of the record in the order managing table 1607, then initiates the printing controller 1604, and ends the process (step 2016).

The printing controller 1604 searches for the record having the status 1904 with the "ready for printing" flag in the order managing table 1607, and acquires an order code string as a result of searching. The printing controller 1604 picks out a single order code from the order code string according to a rule, acquires data, required to perform the printing corresponding to the code, from the printing spool 1608, and then transmits the print data to the printer serving as an output. The printing process is thus performed (step 2017).

Subsequent to the completion of the printing process, the printing controller 1604 searches the order managing table 1607 using the order code according to which the printing process is performed, and sets a "printed" flag to the status 1904 of the record found in the search.

The body of the content in the content provider 120 is thus printed in response to the printing command from the content browsing screen stored in the content provider 120.

The user computer 111, discussed in connection with the first embodiment with reference to FIG. 1, presents the browsing screen stored in the content provider 121 and then issues a printing order using the browsing screen. The steps involved in this process will now be discussed.

Process Flow

FIG. 23 illustrates a fourth content printing process sequence in the network system incorporating the information processing apparatus of the present invention. The fourth content printing process sequence corresponds to a process performed by the user computer 111, the content provider 121, the data center 140, and the printing service provider 130. In the discussion that follows, the user uses the user computer 111 to view the content browsing screen in the content provider 121, and places a printing order from the content provider 121.

The document browser 401 in the user computer 111 transmits, to the content provider 121, the request to present the content browsing screen. The request to present the content browsing screen designates a URL of the content browsing screen desired by the user according to the HTTP protocol. The user may directly input the URL to the document browser 401 using the KB 208. The URL may also be entered when the user selects a link on the screen presented by the document browser 401 in accordance with the HTML (step 2201).

The request to present the content browsing screen issued by the user computer 111 is transmitted through the network 100 and received by the document provider 1501 in the content provider 121 through the NETIF 204. Upon receiving the request, the document provider 1501 retrieves an HTML document corresponding to the designated URL from the content browsing screen storage 1504. The document provider 1501 transmits view data linked to the HTML document to the requesting user computer 111 (step 2202).

The user clicks the print request button with the content browsing screen presented when the user desires the printing of the body of the content of the view image. In response to the clicking of the print request button, the document browser 401 transmits the request to initiate the order receiver to the content provider 121 as described in the print request button display and operation command message (step 2203).

Upon receiving the request to initiate the order producer 1505 and the parameters, the document provider 1501 in the content provider 121 initiates the order producer 1505 and then hands the parameters over to the order producer 1505.

The order producer 1505 stores the parameters in the working area of the HDD 209.

The order producer 1505 issues a printing service information transmission request to the printing service provider 130 to request the printing service provider 130 to transmit printing service information (step 2204). Upon receiving the printing service information transmission request, the document provider 1601 in the printing service provider 130 initiates the order receiver 1602. The order receiver 1602 transmits the printing service information in the printing service managing table 1606 to the content provider 121 (step 2205).

The order producer 1505, which has received the printing service information, stores the printing service information in one of the RAM 202 and the HDD 209.

The order producer 1505 identifies the content code from the first parameter stored in the HDD 209 in step 2204, and searches the content printing information storage 1503 in accordance with the identified content code, and acquires the content printing information 1700 found in the search.

The content printing information location data 1700 includes a first index [DATACENTER]" that indicates the body of the content is present in the data center 140. The order producer 1505 issues, to the data center 140, a request to acquire the content printing information using "ADDRESS=http://www.hanbai_Stock/printinfo/DEF0001.inf" that indicates the location of the content printing information (step 2206).

The document provider 1501 in the data center 140 acquires the desired content printing information from the content printing information storage 1503 in response to the request to acquire the content printing information, and transmits the content printing information to the content provider 121 (step 2207).

The order producer 1505 in the content provider 121, which has acquired the content printing information, stores the content printing information in the HDD 209 while acquiring printing information from within the content printing information. The order producer 1505 acquires setting items meeting a limit range described in the printing information from the printing service information stored in one of the RAM 202 and the HDD 209, and then describes the setting items in the HTML document for presenting a printing condition designating screen.

The order producer 1505 acquires video data based on a view data address described in a content information screen. If information about overlay information is present, a combination operation is performed in accordance with the overlay information. Resulting information is then stored in the working area in the HDD 209 as a preview image to be displayed in a printing condition designating screen (to be discussed later). The information indicating the location of storage is added at a predetermined position in the HTML document for presenting the printing condition designating screen. A HTML document describing the printing condition designating screen is transmitted from the document provider 1501 to the user computer 111 (step 2208B).

The document browser 401 in the user computer 111 displays the printing condition designating screen based on the received HTML document, which has been already discussed in connection with the first embodiment with reference to FIG. 12.

The user sets the output printer, sheet size, and number of prints using the printing condition designating screen indicated by the document browser 401 in the user computer 111. As necessary, the user sets the printing conditions by calling the detail setting screen by clicking the print order button, entering a detail setting, and then returning to the printing condition designating screen.

After verifying the settings, the user clicks the print order button. In response to the clicking of the print order button, the document browser 401 transmits an initiation command to the order producer 1505 in the content provider 121, which is a link destination described in the HTML document. Also transmitted during the transmission of the initiation command are the printing conditions as the parameter (step 2209).

The document provider 1501 in the content provider 121 re-initiates the order producer 1505.

The order producer 1505 stores the printing conditions as the parameter in the working area in the HDD 209, and then transmits, to the user computer 111 through the document provider 1501, a verification screen HTML document for presenting a verification screen on which the user verifies that the printing is performed under the printing conditions set by the user (step 2210).

Upon receiving the HTML document for the verification screen, the document browser 401 in the user computer 111 presents the verification screen, which has been already discussed in connection with the first embodiment with reference to FIG. 13. The user clicks the enter button to enter the printing order after checking the preview image and printing conditions. The document browser 401 commands the order producer 1505 to enter the order (step 2211).

In response to the order enter command, the document provider 1501 in the content provider 121 generates the printing order information, discussed with reference to FIG. 20, based on the content information in the content printing information stored in the HDD 209 in step 2208B and the printing conditions stored in step 2210.

The document provider 1501 issues an initiation command to the order receiver 1602 in the printing service provider 130 to place a printing order (step 2212). During the initiation command, a content provider code, the generated printing order information, and a URL as a return location are transmitted as the parameters. The return location in the second embodiment is determined in the initiation command by a CGI application.

In response to the initiation command of the order producer 1505, the document provider 1601 in the printing service provider 130 initiates the order receiver 1602 (step 2213).

The order receiver 1602 searches the content provider managing table 1605 for a record having the content provider code handed over as the parameter, and acquires the base address 1802 of the record found in the search. The order receiver 1602 queries the document provider 1601 about a sender of the initiation command, thereby checking that the sender of the initiation command is the content provider 121.

The order receiver 1602 issues a new order code, and generates a new record as described in the order managing record 914. The order code 901, content provider code 902 received by the parameter, and content address 903 acquired from the received printing order information are stored in the new record of the order managing table 904. The status 904 is set to the "ordering in progress".

If overlay information is present in the printing order information, a filename is attached thereto before storage so that a searching operation is performed in the order code in the printing spool 1608 or in the order managing table 1607.

The order receiver 1602 commands the order producer 1505 to initiate in the content provider 120, which is the return URL handed over as the parameter. As the initiation command, the order code is transmitted as the parameter.

After setting an "image under production" to the status 904 in the order managing record, the order receiver 1602 initiates the printing data producer 1603 and ends the process.

In response to the initiation command of the order producer 1505 transmitted by the printing service provider 130 in step 2213, the document provider 1501 in the content provider 121 initiates the order producer 1505. The order producer 1505 generates an HTML document containing the order code handed over by the parameter, and transmits the HTML document to the user computer 111 (step 2214).

The document browser 401 in the user computer 111 displays the order reception end screen based on the HTML document received from the content provider 121. The order reception end screen presents a display for the order code describing that the printing order has been received, and a link through which content viewing on the content provider 121 may be continued (step 2215).

The printing data producer 1603, which is initiated in step 2213 in the printing service provider 130, receives the order code as the parameter at the startup thereof. The printing data producer 1603 searches the order managing table 1607 according to the order code, and acquires the content address 903 from the record found in the search.

The printing data producer 1603 transmits a request to acquire the body of the content pointed by the content address to the data center 140. The communication protocol used in the acquisition request is one of the FTP protocol and the HTTP protocol stored in the usable protocol 1803 in the content provider managing record 812. The FTP protocol is used with priority in the second embodiment (step 2216).

In response to the acquisition request of the content body from the printing service provider 130, the document provider 1501 in the data center 140 acquires the requested content in the content storage 1502, and transmits the content to the printing service provider 130 (step 2217).

Upon receiving the content, the printing data producer 1603 in the printing service provider 130 stores, into the printing spool 1608, the content data from the record in the order managing table 1607 and data required for printing, such as a variety of settings and associated information in a state that allows such items of data to be identified with an order code. The printing data producer 1603 then sets a "ready for printing" flag to the status 904 of the record in the order managing table 1607, then initiates the printing controller 1604, and ends the process (step 2218).

The printing controller 1604 searches for the record having the status 1904 with the "ready for printing" flag in the order managing table 1607, and acquires an order code string as a result of searching. The printing controller 1604 picks out a single order code from the order code string according to a rule, acquires data required to perform the printing corresponding to the code from the printing spool 1608, and then transmits the print data to the printer serving as an output. The printing process is thus performed (step 2219).

Subsequent to the completion of the printing process, the printing controller 1604 searches the order managing table 1607 using the order code according to which the printing process is performed, and sets a "printed" flag to the status 1904 of the record found in the search.

The body of the content in the data center 140 is thus printed in response to the printing command from the content browsing screen stored in the content provider 122.

The construction of a data processing program read by the information processing apparatus of the present invention is discussed with reference to a memory map shown in FIG. 24.

FIG. 24 illustrates the memory map of a storage medium storing a variety of data processing programs read by the information processing apparatus of the present invention.

Information managing a group of programs stored in the storage medium, such as a version and the programmer's name of each program, is stored. In addition, information depending on an OS at the program reader's side, such as an icon identifying the program, is also stored, although such items of information are not shown.

Data associated with the variety of programs are also managed in the same directory as that of the above pieces of information. A software program for installing the programs-into a computer, and a software program for decomposing the installing program if it is composed may also be stored.

The process shown in FIG. 14 may be carried out by a host computer under the control of a program installed from the outside. In such a case, a variety of pieces of information including programs may be fed to an output apparatus from a storage medium such as a CD-ROM, a flash memory, or a FD, or from an external storage medium through a network. The present invention is also applied to such an arrangement.

A storage medium storing program codes of a software program for performing the functions of the present embodiments may be supplied in a system or an apparatus, and the system or a computer (a CPU or an MPU) may read and execute the program codes stored in the storage medium. Such an arrangement falls within the scope of the present invention.

The program codes of the software program read from the storage medium performs the functions of the embodiments. The storage medium storing the program codes falls within the scope of the present invention.

Storage media for feeding the program codes include a flexible disk, a hard disk, an optical disk, a magneto-optical disk, a CD-ROM (Compact Disk-ROM), a CD-R (Recordable CD), a magnetic tape, a nonvolatile memory card, a ROM (Read-Only Memory), and an EEPROM (Electrically Erasable Programmable Read-Only Memory).

The functions of the embodiments are performed when the computer executes the read program. Furthermore, the functions of the embodiments are performed when an OS (operating system) running on the computer performs an actual process in whole or in part in response to the instructions of the program codes. Such an arrangement also falls within the scope of the present invention.

The program codes read from the storage medium are stored in a memory in a feature expansion board or a feature expansion unit connected to the computer. A CPU mounted on the feature expansion board or the feature expansion unit performs partly or entirely the actual process in response to the instruction from the program codes. The functions of the embodiments are thus performed through the process. Such an arrangement falls within the scope of the present invention.

In accordance with the present invention, the content printing information, the print service information, and the content data transmitted over the network are acquired by switching the communication protocol in response to the source of the content when the content is printed using a number of content providers and printing service providers present on the network.

By virtue of the present invention, a number of content providers and printing service providers are utilized, and communication difficulty is minimized.

The content printing information, the print service information, and the content data transmitted over the network are acquired so that optimum printing output conditions are designated by using a print solution provided by the printing service provider. A printing process environment that is easy to use is thus provided.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus for communicating with a plurality of content-providing apparatuses that provide content printing information required to perform a printing operation based on content data, the information processing apparatus comprising:

a communication protocol storage unit adapted to link the plurality of content-providing apparatuses and the corresponding types of communication protocols, respectively, and to store information for the plurality of content-providing apparatuses;

a communication protocol determining unit adapted to determine, when a print order is received from a user terminal, a type of communication protocol that is used to communicate with one of the plurality of the content-providing apparatuses, which provides the content ordered to be printed, based on the information stored in the communication protocol storage unit;

an acquisition unit adapted to acquire the content printing information from the content-providing apparatus using the type of communication protocol determined by the communication protocol determining unit; and a generating unit adapted to generate screen data representing a screen for setting printing conditions of the content data, based on the content printing information acquired by the acquisition unit.

2. An information processing apparatus according to claim 1, further comprising a conversion unit adapted to convert an address of the content-providing apparatus in accordance with the type of communication protocol determined by the communication protocol determining unit.

3. An information processing apparatus according to claim 1, further comprising:

a content data acquisition unit adapted to acquire content data from the content-providing apparatus using the type of communication protocol determined by the communication protocol determining unit; and a printing unit adapted to perform a printing operation under the printing conditions set on the screen, based on the content data acquired by the content data acquisition unit.

4. A method of processing information, the method comprising the steps of:

determining a type of communication protocol based on information representing at least one communication protocol when data is acquired from a plurality of content-providing apparatuses that provide content printing information required to perform a printing operation based on content data;

acquiring the content printing information from one of the plurality of content-providing apparatuses using the type of communication protocol determined in the determining step; and generating screen data representing a screen for setting printing conditions of the content data, based on the content printing information acquired in the acquiring step.

5. A method according to claim 4, further comprising the steps of:

acquiring content data from one of the plurality of content-providing apparatuses using the type of communication protocol determined in the determining step; and performing a printing operation under the printing conditions set on the screen, based on the content data acquired in the step of acquiring content data.

6. A method according to claim 4, further comprising the step of converting an address of one of the plurality of content providing apparatuses in accordance with the type of communication protocol determined in the determining step.

7. A computer-program product stored on a computer-readable medium, the computer-program product embodying computer-executable program codes for implementing a method of processing information, the method comprising the steps of:

determining a type of communication protocol based on information representing at least one communication protocol when data is acquired from a plurality of content-providing apparatuses that provide content printing information required to perform a printing operation based on content data;

acquiring the content printing information from one of the plurality of content-providing apparatuses using the type of communication protocol determined in the determining step; and generating screen data representing a screen for setting printing conditions of the content data, based on the content printing information acquired in the acquiring step.

8. An information processing apparatus for communicating with a plurality of content-providing apparatuses that provide content data, the information processing apparatus comprising:

a communication protocol storage unit adapted to link the plurality of content-providing apparatuses and the corresponding types of communication protocols, respectively, and to store information for the plurality of content-providing apparatuses;

a communication protocol determining unit adapted to determine, when a print order is received from a user terminal, a type of communication protocol that is used to communicate with one of the plurality of content-providing apparatuses which provide the content data ordered to be printed, based on the information stored in the communication protocol storage unit; and an acquisition unit adapted to acquire the content data from the content-providing apparatus using the type of communication protocol determined by the communication protocol determining unit.

9. An information processing apparatus according to claim 8, further comprising a conversion unit adapted to convert an address of the content providing apparatus in accordance with the type of communication protocol determined by the communication protocol determining unit.

10. A method of processing information, the method comprising the steps of:

determining, when a print order is received from a user terminal, a type of communication protocol that is used to communicate with one of a plurality of content-providing apparatuses which provide content data ordered to be printed, based on information representing at least one communication protocol when the content data is acquired from the plurality of content-providing apparatuses that provide the content data;

acquiring the content data from one of the plurality of content-providing apparatuses using the type of communication protocol determined in the determining step.

11. A method according to claim 10, further comprising the step of converting an address one of the plurality of content providing apparatuses in accordance with the type of communication protocol determined in the determining step.

12. A computer-program product stored on a computer-readable medium, the computer-program product embodying computer-executable program codes implementing a method of processing information, the method comprising the steps of:

determining, when a print order is received from a user terminal, a type of communication protocol that is used to communicate with one of a plurality of content-providing apparatuses which provide content data ordered to be printed, based on information representing at least one communication protocol when the content data is acquired from the plurality of content-providing apparatuses that provide the content data;

acquiring the content data from one of the plurality of content-providing apparatuses the apparatus using the type of communication protocol determined in the determining step.

* * * * *

UNITED STATES PATENT AND TRADEMARK OFFICE
CERTIFICATE OF CORRECTION

| | | |
|---|---|---|
| PATENT NO. | : 7,317,549 B2 | |
| APPLICATION NO. | : 10/442233 | |
| DATED | : January 8, 2008 | |
| INVENTOR(S) | : Naito | |

It is certified that error appears in the above-identified patent and that said Letters Patent is hereby corrected as shown below:

COVER SHEET:
    ABSTRACT, Line 4, "provide" should read -- provider --.

COLUMN 7:
    Line 29, "the data" should read -- the data to --.

COLUMN 13:
    Line 17, "an" should read -- a --.

COLUMN 24:
    Line 14, "shown" should read -- shown in --.

COLUMN 26:
    Line 21, "response" should read -- response to --.

COLUMN 30:
    Line 67, "A" should read -- a --.

COLUMN 33:
    Line 42, "An" should read -- A --.

COLUMN 36:
    Line 10, "transmits-the" should read -- transmits the --.

COLUMN 38:
    Line 10, "[DATACENTER]"" should read -- "[DATACENTER]" --.

UNITED STATES PATENT AND TRADEMARK OFFICE
CERTIFICATE OF CORRECTION

PATENT NO. : 7,317,549 B2
APPLICATION NO. : 10/442233
DATED : January 8, 2008
INVENTOR(S) : Naito It is certified that error appears in the above-identified patent and that said Letters Patent is hereby corrected as shown below:

<u>COLUMN 41</u>:
        Line 4, "grams-into" should read -- grams into --;
        Line 11, "or a" should read -- or an --; and
        Line 18, "may" should read -- may be --.

<u>COLUMN 44</u>:
        Line 25, "address" should read -- address of --.

Signed and Sealed this

Twenty-third Day of December, 2008

JON W. DUDAS
*Director of the United States Patent and Trademark Office*